United States Patent [19]
Onishi et al.

[11] Patent Number: 5,788,819
[45] Date of Patent: Aug. 4, 1998

[54] METHOD FOR DRIVING LIQUID, AND METHOD AND APPARATUS FOR MIXING AND AGITATION EMPLOYING THE METHOD

[75] Inventors: Toshikazu Onishi, Machida; Matsuomi Nishimura, Ohmiya; Kazuo Isaka, Tokyo; Kazumi Tanaka, Yokohama; Takeshi Miyazaki, Ebina, all of Japan

[73] Assignee: Canon Kabushiki Kaisha, Tokyo, Japan

[21] Appl. No.: 926,009

[22] Filed: Sep. 9, 1997

Related U.S. Application Data

[63] Continuation of Ser. No. 558,036, Nov. 13, 1995, abandoned, which is a continuation of Ser. No. 141,608, Oct. 27, 1993, abandoned.

[30] Foreign Application Priority Data

| Oct. 27, 1992 | [JP] | Japan | 4-310786 |
| Nov. 24, 1992 | [JP] | Japan | 4-334905 |
| Jan. 6, 1993 | [JP] | Japan | 5-015840 |
| Jan. 26, 1993 | [JP] | Japan | 5-028479 |

[51] Int. Cl.$^6$ .................. H02K 44/02; G01N 35/08
[52] U.S. Cl. .................. 205/155; 417/50; 417/53; 417/54; 417/55
[58] Field of Search ............... 204/155; 417/50, 417/53, 54, 55

[56] References Cited

U.S. PATENT DOCUMENTS

| 2,980,022 | 4/1961 | McCarthy | 310/11 |
| 3,398,685 | 8/1968 | Stuetzer | 103/1 |
| 3,997,836 | 12/1976 | Haruki et al. | 324/64 |
| 4,398,894 | 8/1983 | Yamamoto | 436/517 |
| 4,463,798 | 8/1984 | Pogson et al. | 161/1 |
| 4,597,848 | 7/1986 | Oka et al. | 204/418 |
| 4,634,057 | 1/1987 | Coffee et al. | 239/690 |
| 5,256,036 | 10/1993 | Cole | 417/48 |

FOREIGN PATENT DOCUMENTS

| 3925749 | 10/1990 | Germany . |
| 61-218359 | 9/1986 | Japan . |
| 62-150148 | 7/1987 | Japan . |
| 4-13444 | 1/1992 | Japan . |
| 4-52067 | 2/1992 | Japan . |
| 1025234 | 4/1966 | United Kingdom ............ 204/155 |
| WO91/02375 | 2/1991 | WIPO . |

OTHER PUBLICATIONS

J.M. Singer et al., "The Latex Fixation Test," American Journal of Medicine, pp. 888-892, 1956 Dec.

A Faure et al., "Quantitative Study of Tests Using Latex Particles Coated with Proteins or Peptites," Protites of the Biological Fluids pp. 589-593, 1972 no month.

Runnells et al., "In Situ Electromigration as a Method for Removing Sulfate, Metals, and Other Contaminants from Ground Water." (1993) pp. 121-129.

*Primary Examiner*—Arun S. Phasge
*Attorney, Agent, or Firm*—Fitzpatrick, Cella, Harper & Scinto

[57] ABSTRACT

A method for driving an ionic conductive liquid comprises placing a pair of electrodes in the ionic conductive liquid, and exerting an electromagnetic force to the liquid by application of a voltage between the pair of the electrodes to drive the liquid. A method for mixing and agitating a medium comprises feeding the medium to an ionic conductive liquid, placing a pair of electrodes in the ionic conductive liquid, and exerting an electromagnetic force to the liquid by application of a voltage to drive the liquid and to mix and agitate the medium. An apparatus for delivering a liquid comprises a container for housing an ionic conductive liquid, at least one pair of electrodes in the container, and a power source for applying an voltage between the pair of electrodes, the apparatus delivering the liquid from the container by driving the liquid according to the method for driving.

18 Claims, 26 Drawing Sheets

METHOD FOR DRIVING LIQUID, AND METHOD AND APPARATUS FOR MIXING AND AGITATION EMPLOYING THE METHOD

This application is a continuation of application Ser. No. 08/558,036 filed Nov. 13, 1995, now abandoned, which is a continuation of application Ser. No. 08/141,608 filed Oct. 27, 1993, now abandoned.

BACKGROUND OF THE INVENTION

1. Field of the Invention

The present invention relates to a method for driving an ionic electric conductive liquid by application of electromagnetic force. The present invention also relates to a method for mixing and agitating different kinds of liquids by the above method for driving the liquid. The present invention further relates to apparatuses for transfer, mixing, agitation, etc. of a liquid by employing the above method.

2. Related Background Art

Conventionally, for driving a liquid, mechanical force is applied to the liquid with a rotating blade, a stirring piece, or the like.

In another method, electrical force, especially electromagnetic force is employed to drive a liquid. Examples thereof are shown below.

Japanese Patent Application Laid-Open No. 4-52067 discloses a method for driving molten metal by electromagnetic force generated by interaction of an electric current flowing in the molten metal and an external magnetic field.

Japanese Patent Application Laid-Open No. 61-218359 discloses an electromagnetic pump which applies an external magnetic field and an electric field to an electric conductive liquid in a duct, and drives the liquid by the resulting electromagnetic force.

Japanese Patent Application Laid-Open No. 4-13444 discloses a method in which a magnetic field is applied to molten metal to generate eddy current and to produce electromagnetic force by interaction of the eddy current with the magnetic field, and thereby the molten metal is made to flow.

As liquid transporting apparatuses, various pumps are known in addition to the apparatuses used in the above liquid-driving method. Among them, pumps capable of transporting a minute amount (e.g., 1 µl or less) of liquid are known: e.g., a pump utilizing electric distortion caused by a piezoelectric element, a pump utilizing a vapor pressure given by heat of resistor-heating element, etc. In recent years, fine gear pumps are being developed based on micromachine technique.

Further, ultrasonic wave, and electro-hydrodynamic action (EHD) such as electroosmosis and electrophoresis are known to be useful for transporting a liquid.

Mechanical external force, however, is not suitable generally for driving a minute amount of liquid since the minimum amount of the liquid to be driven is limited by the size of the rotating blade or the stirring piece.

Electromagnetic methods enable transporting a minute amount of a liquid since the methods utilize electroconductivity of the liquid and apply the force only to the liquid. However, the electromagnetic method disadvantageously requires a magnetic field application means and electric field application means separately. Methods of utilizing an induced current caused by a magnetic field require a driving means for an alternate magnetic field or a rotating magnetic field, and are limited in application to liquids having sufficiently high electric conductivity.

The aforementioned pumps utilizing a piezoelectric element or a resistor-heater, although they are capable of transporting a minute amount of liquid, cause pulsation of flow, resulting disadvantageously in instability of liquid transportation when the amount of transported liquid is minute.

The ultrasonic vibration method involves the problem that it also vibrates the container of the liquid and may cause damage to the container, or disadvantageous uncontrollability of liquid flow.

The electrohydrodynamic method, when employed for transporting a highly electroconductive liquid, tends to cause electrolysis by applied voltage to evolve a gas, or deterioration of the electrode, making the liquid transportation difficult, disadvantageously.

The pumps made by micromachine technique are complicated in the construction and are expensive.

On the other hand, agglutination methods are known for determining a concentration of a substance in a sample by causing agglutination of the substance. For example, an immunologically active antigen is brought into contact with a biological substance and measuring the degree of the resulting agglutination.

One example of such methods is latex agglutination immunoassay (LAIA) found by J. M. Singer et al. (Am. J. Med., 21888 (1956)). In this method, a particulate matter like polystyrene particles carrying an antibody capable of selectively combining with an antigen is dispersed in a liquid medium such as water to form a dispersion (a latex reagent). A sample solution containing the aforementioned immunologically active antigen is brought into contact with the dispersion to cause agglutination. The concentration of the antigen in the sample solution is measured by observation of the resulting agglutination. Later, many investigations have been made of this method. The degree of the agglutination is usually judged by visual observation because of the advantage of simplicity and quickness although quantitative determination is not possible.

In recent years, optical methods were being investigated for measurement of the degree of agglutination. A. Fature et al. reported a method of quantitative analysis by measurement of change of turbidity caused by the agglutination reaction and dynamic analysis of the turbidity change (A. Fature et al.: Protides Biol. Fluids, Proc. Colloq., 2589 (1972)).

In such measurement employing the agglutination reaction, the degree of agglutination has been conventionally measured after the mixing a latex reagent with a sample solution and leaving the mixture standing for a certain time. However, such a method of mixing and standing of a reagent and a sample solution requires a long time for measurement and resulting in low precision of the measured data, since the reaction rate depends only on spontaneous diffusion of the latex reagent.

Therefore, in measurement of a minute amount of a substance by agglutination reaction with a biological substance in a liquid medium, the liquid medium is agitated to promote the reaction for quickness of the test.

The agitation of the liquid medium is conducted by mechanical stirring with a stirring piece or mechanical vibration. Such mechanical agitation requires disadvantageously a large amount of a liquid medium, a reagent, or a sample solution, or a large size of the apparatus itself.

Various methods and apparatuses are used in analysis of a minute amount of substances such as nucleic acid, immunologically active antigens, and other biological substances. In such analysis, a reagent which will combine selectively with the minute substance is fixed on a solid material such as a filter, latex particles, glass beads and the like, and the minute substance in a sample liquid reacts with the solid material, and thereafter the reaction adduct is detected by a radioactive method or an optical method. Specific examples are radioimmunoassay (RIA), enzyme immunoassay (EIA), fluorescence immunoassay (FIA), and so forth. (See "Kensa to Gijutsu (Examination and Technique), Vol. 16, No. 7 (1988)).

In these methods, the reaction adduct is labelled with a radioactive isotope, a dye, or an enzyme for detection by radioactivity, absorption of emission of light, or enzymatic activity. Generally, these method require removal from the solid material a non-reacting test material or a non-reacting labelled reagent by washing, or BF separation.

The reaction process and washing process for the analysis of the minute substance is conducted generally in a liquid medium, and the liquid medium and the solid material (e.g., beads) needs to be agitated to improve the efficiency of the reaction and the washing.

The known agitation methods for the above purpose include methods which use a solid material like magnetic beads or magnetic fine particles with application of magnetic force, and methods which agitate with a stirring piece for a solid material such as a filter.

The agitation with magnetic fine particles is disadvantageous in that the preparation of satisfactory magnetic fine particle is not simple and that, when particle size of the magnetic fine particles is made extremely small (e.g., submicron order), the magnetic force will be small to result in a poor agitation efficiency. Furthermore, in agitation of a minute amount of a liquid material, since the vessel (or cell) has only a limited small space for holding the liquid to be agitated, the magnetic fine particles may clog the space to result in failure of the intended agitation, disadvantageously.

The agitation with a stirring piece tends to cause carryover owing to insufficient washing of the stirring piece disadvantageously, and is not suitable for a minute amount of a liquid material.

Detection of fine particles in a liquid medium is practiced generally with an apparatus which measures turbidity of the liquid dispersion in a batch cell or the like. Such an apparatus measures optical properties of the liquid dispersion containing a number of particles.

On the contrary, there is an apparatus which detects optically the fine particles as a particle unit, namely a single particle or an aggregation of several particles. This is a type of apparatus exhibits higher detection sensitivity than the above mentioned type of apparatus. However, the apparatus detecting the fine particles as a particle unit requires disadvantageously a complicated apparatus constitution for delivering the particles as a particle unit to the optical detection region. For example, the fine particles in a liquid dispersion can be transported in a particle unit by a sheath flow cell which forms narrow flow of a liquid dispersion in a form of a laminar flow. Such a laminar flow requires a flow velocity as high as about 10 m/sec in a large amount. Accordingly, this method needs to use a large amount of the liquid dispersion and a complicated driving apparatus such as a pump for driving the fluid.

SUMMARY OF THE INVENTION

An object of the present invention is to provide a method for driving a liquid having an ionic electric conductivity in a relatively wide range and being held in a minute region stably without electrolysis and other undesired effects, and to provide an apparatus for delivering the liquid.

Another object of the present invention is to provide a method and an apparatus for causing an agglutination reaction simply in a short time with a small amount of a liquid (a dispersion, a sample solution, etc.), and to provide a method and an apparatus for measuring a concentration of a substance in a sample solution.

A further object of the present invention is to provide a method and an apparatus for detecting a minute amount of a substance with high efficiency of a reaction step and a washing step in a shortened measurement time by employing an agitation method which enable sufficient agitation of a minute amount of a liquid (a sample solution, a reagent solution, etc.).

A still further object of the present invention is to provide a method for detecting fine particles readily in a minute amount of a liquid dispersion, and to provide an apparatus for detecting fine particles by employing a simple construction of the apparatus.

According to an aspect of the present invention, there is provided a method for driving an ionic conductive liquid, comprising placing a pair of electrodes in the ionic conductive liquid, and exerting an electromagnetic force to the liquid by application of a voltage between the pair of electrodes to drive the liquid.

According to another aspect of the present invention, there is provided a method for driving an ionic conductive liquid, comprising feeding the ionic conductive liquid to a gap between a pair of electrodes, and exerting an electromagnetic force to a portion of the liquid in the vicinity of at least one of the electrodes by application of a voltage between the pair of the electrodes to drive the liquid.

According to still another aspect of the present invention, there is provided a method for mixing and agitating a medium, comprising feeding the medium to an ionic conductive liquid, placing a pair of electrodes in the ionic conductive liquid, and exerting an electromagnetic force to the liquid by application of a voltage to drive the liquid and to mix and agitate the medium.

According to a further aspect of the present invention, there is provided a method for mixing and agitating a medium, comprising feeding an ionic conductive liquid and a medium to a gap between a pair of electrodes, and exerting an electromagnetic force to a portion of the liquid in the vicinity of at least one of the electrodes by application of a voltage between the pair of the electrodes to drive the liquid and to mix and agitate the medium.

According to a still further aspect of the present invention, there is provided an apparatus for delivering a liquid, comprising a container for housing an ionic conductive liquid, at least one pair of electrodes in the container, and a power source for applying a voltage between the pair of electrodes, the apparatus delivering the liquid from the container by driving the liquid according to the method mentioned above.

According to a still further aspect of the present invention, there is provided an apparatus for mixing and agitating a medium, comprising a container for housing an ionic conductive liquid, at least one pair of electrodes in the container, a first means for feeding the liquid into the container, a second means for feeding a medium into the container, and a power source for applying a voltage to the pair of electrodes, the apparatus mixing and agitating the medium in the container according to the method mentioned above.

The method for driving a liquid and the method for mixing and agitating a liquid of the present invention mentioned above is applicable to an agglutination reaction and detection of a minute amount of a substance.

DESCRIPTION OF THE PREFERRED EMBODIMENTS

The liquid to be driven by the liquid-driving method of the present invention is a liquid having ionic conductivity such as a solution of an electrolyte like sodium chloride and potassium chloride in a solvent such as water and organic solvents, and a molten electrolyte. The electrolyte in the liquid is required to be partly or entirely dissociated to form ions in order to obtain the ionic conductivity.

Such an ionic conductive liquid has desirably a higher electric conductivity, preferably not lower than $10^{-5}$ S/cm, more preferably not lower than $10^{-4}$ S/cm. At a lower electric conductivity, the electric current flowing between a pair of electrodes is lower, and simultaneously the magnetic field around the electrodes is lower, which weakens the electromagnetic force acting on the ionic conductive liquid, thereby resulting in decrease of the flow of the liquid.

The electrode useful in the present invention is made of a material including conventionally known electrode materials such as metal, carbon, polymeric materials containing the electrode material dispersed therein as an electric conductive filler, and conducting polymer material like polypyrrole, and so forth. Generally the electrode material is selected depending on the voltage applied to the pair of electrodes. In the case where the applied voltage has DC component, some electrode materials tend to be oxidized to cause dissolution of the electrode or formation of an oxide film, and may adversely affect the flow of the liquid or durability of the electrodes. In such a case, a material such as platinum which is resistant to anodic oxidation should be selected as the electrode material. If the applied voltage is lowered to avoid the above adverse effect, the electromagnetic force acting on the ionic conductive liquid is limited at a lower level, whereby the upper limit of the liquid flow velocity may be limited to be low, or in extreme cases the liquid flow is suppressed.

In consideration of such matters, the voltage applied between the electrode pair is preferably a periodically changing voltage. The wave-form of the changing voltage is not specially limited, and may be a rectangular wave, a sine wave, a triangle wave, or the like.

The frequency and the voltage amplitude affect the aforementioned anodic oxidation of the electrode and the electrolysis of the liquid (formation of bubbles, reaction, etc.). Generally, a lower frequency and larger voltage amplitude tend to cause the anodic oxidation or the electrolysis. For example, for an aqueous electrolyte solution having an electric conductivity of about 1 mS/cm, the frequency is preferably 100 KHz or higher, more preferably 1 MHz or higher. The preferred voltage amplitude depends on distance between the pair of electrodes, the shape of the electrodes, and electric conductivity of the aqueous electrolyte solution, and is about $10^4$ to $10^6$ V/m in terms of electric field strength.

Figure 1A:
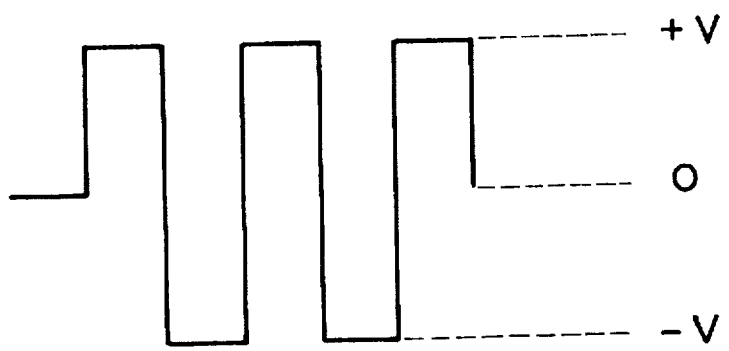
FIGS. 1A to 1C show examples of the wave-form of the periodically changing voltage.

The periodically changing voltage may be an AC voltage shown in FIG. 1A. An AC voltage which has an average in time of the applied voltage is zero is particularly preferred because it is less liable to cause anodic oxidation of the electrode and electrolysis of the liquid.

Figure 1B:

If necessary, two or more AC voltages may be superposed, or an AC voltage and a DC voltage may be superposed as shown in FIG. 1B provided that the DC voltage level is limited to be within the range where the aforementioned anodic oxidation is not caused.

Figure 1A:
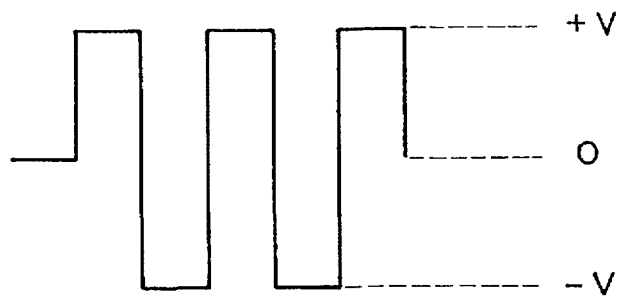
Figure 1B:
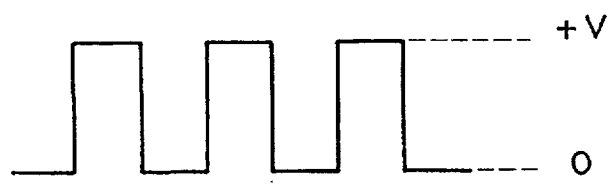
Figure 1C:
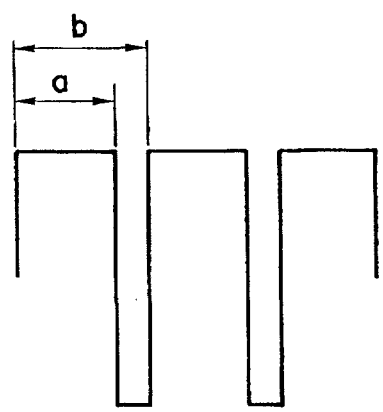

If the duty ratio is changeable as shown in a rectangular wave voltage in FIG. 1C, the duty ratio is preferably in the range of 10% to 90%, more preferably from 20% to 80%. At the duty ratio of lower than 10% or higher than 90%, the responsiveness of the ionic conductive liquid to the electric field is low, which slows down the motion of the ionic conductive liquid near the electrode, and weaken the flow of the liquid owing to decrease of exerting electromagnetic force.

At least one of the pair of the electrodes, in the present invention, functions as an electrode (working electrode) which exert an electromagnetic force to ions in the liquid.

Although the principle of the liquid driving according to the present invention is not completely elucidated, the driving is assumed to be caused by the principle below by taking one of the pair of the electrodes as the working electrode and the other as a counter electrode.

When a voltage is applied between the working electrode and the counter electrode, an electric field is formed between the two electrodes. This electric field lets the ionic conductive liquid move, thereby causing flow of an electric current. Simultaneously a magnetic field is formed around the working electrode by the action of the electric current flowing through the working electrode. The ionic conductive liquid moved by the electric field around the working electrode receives electromagnetic force (Lorentz's force). This Lorentz's force is assumed to constitute the principle of the liquid driving. When an AC is applied to the working electrode and the counter electrode, the action of the electric field on the ionic conductive liquid is negligible substantially on time average, and an electromagnetic force only acts on the liquid.

The constitution of the working electrode of the present invention is preferably such that a strong electric field is applied to the ionic conductive liquid and a strong magnetic field is generated around the working electrode. Therefore, the electrodes are made in a shape which enables concentration of the electric field at the working electrode so as to make strong both the electric field, and the magnetic field around the working electrode.

With such a working electrode, magnetic field application and electric field application can be conducted simultaneously in a simple manner. Therefore, the means for magnetic field application and the means for electric field application need not be separately provided.

The examples of the constitution of the electrode used in the present invention are described below by reference to drawings.

Figure 2:
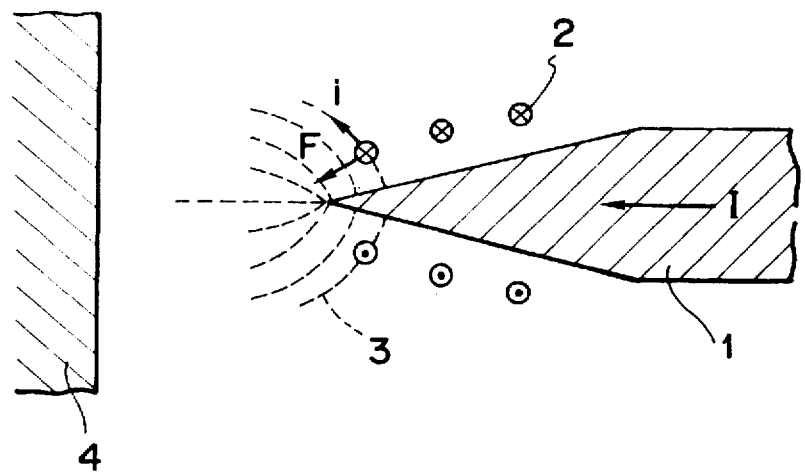
FIG. 2 is a drawing for explaining a constitution of an electrode pair and the principle of driving of a liquid according to the present invention.

In FIG. 2, a voltage is applied between a working electrode 1 and a counter electrode 4. The working electrode has a tip in a conical shape. On application of the voltage, an ionic conductive liquid in the vicinity of the working electrode is driven along the electric field (electric force lines 3) in the direction shown by the symbol "i", and an electric current I flows through the working electrode 1. This electric current produces a magnetic field 2 in a concentric state around the axis of the conical working electrode as the center. Thereby, the ionic conductive liquid in the vicinity of the working electrode moves under the action of the electric field 3 produced between the working electrode and the counter electrode. Therefore, the liquid receives electromagnetic force F from the magnetic field 2 in an approximate direction along the conical face of the tip portion of the working electrode. This direction is not changed if the polarity of the applied voltage is reversed and is independent of the positive or negative nature of the ion.

Figure 3:
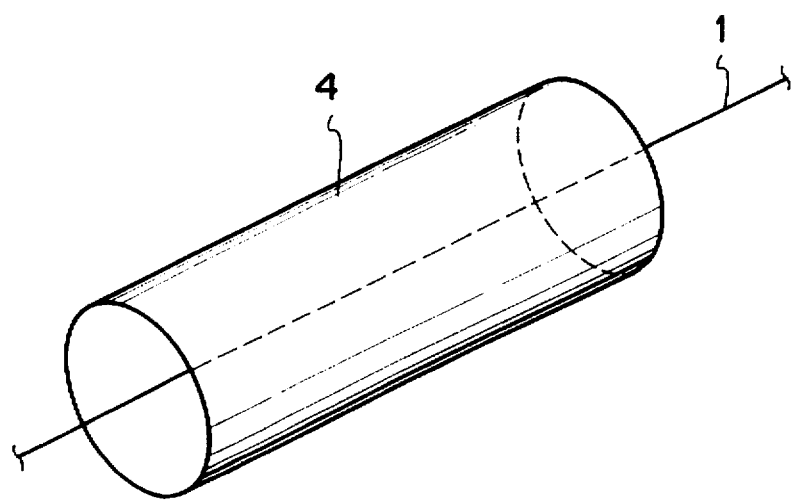
FIG. 3 is a drawing showing another constitution of the electrode pair employed in the present invention.
Figure 4:
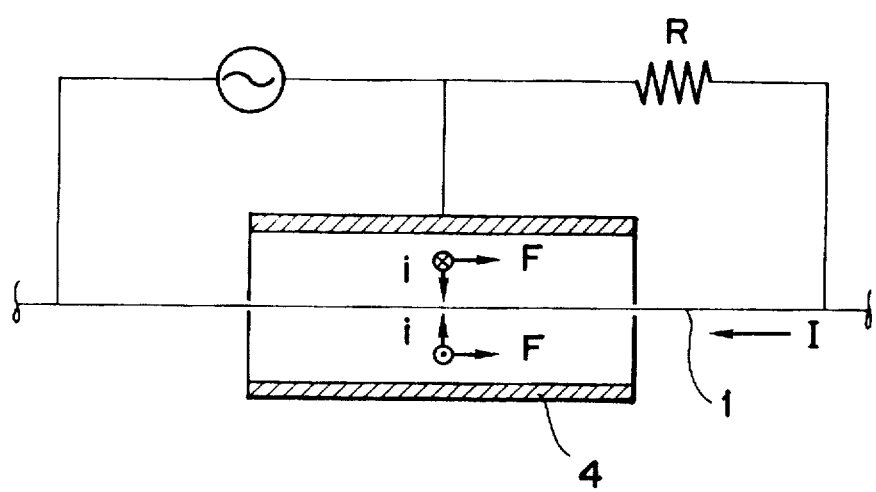
FIG. 4 illustrates a state of voltage application and driving of a liquid in the electrode constitution of FIG. 3.

FIG. 3 shows another constitution in which an electric conductive cylindrical tube is employed as a counter electrode 4 and on the center axis a line-shaped working electrode 1 is provided. When an electric field is applied by an electric circuit and simultaneously electric current is allowed to flow through the linear electrode as shown in FIG. 4 as an example, the ionic conductive liquid moves in the direction of the axis of the cylindrical tube by receiving an electromagnetic force F under the interaction of the current flow direction (i in the drawing) caused by the electric field and the magnetic field formed by the linear electrode. In FIG. 4, the current I flows through the linear electrode and cation moves thereby. The direction of movement is not changed if the polarity of the applied voltage is reversed.

Figure 5:
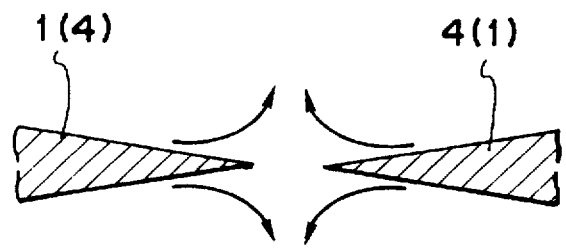
FIG. 5 a drawing illustrating another example of constitution of the electrode pair and the direction of liquid driving of the present invention.

Two electrodes, each having a conical shape as the electrode shown in FIG. 2, may be provided in opposition to constitute a pair of electrodes as illustrated in FIG. 5. In this constitution, one electrode serves as the working electrode 1 and the other one serves as the counter electrode 4. On application of a voltage, the liquid flows as shown by arrow marks in FIG. 5.

Figure 6:
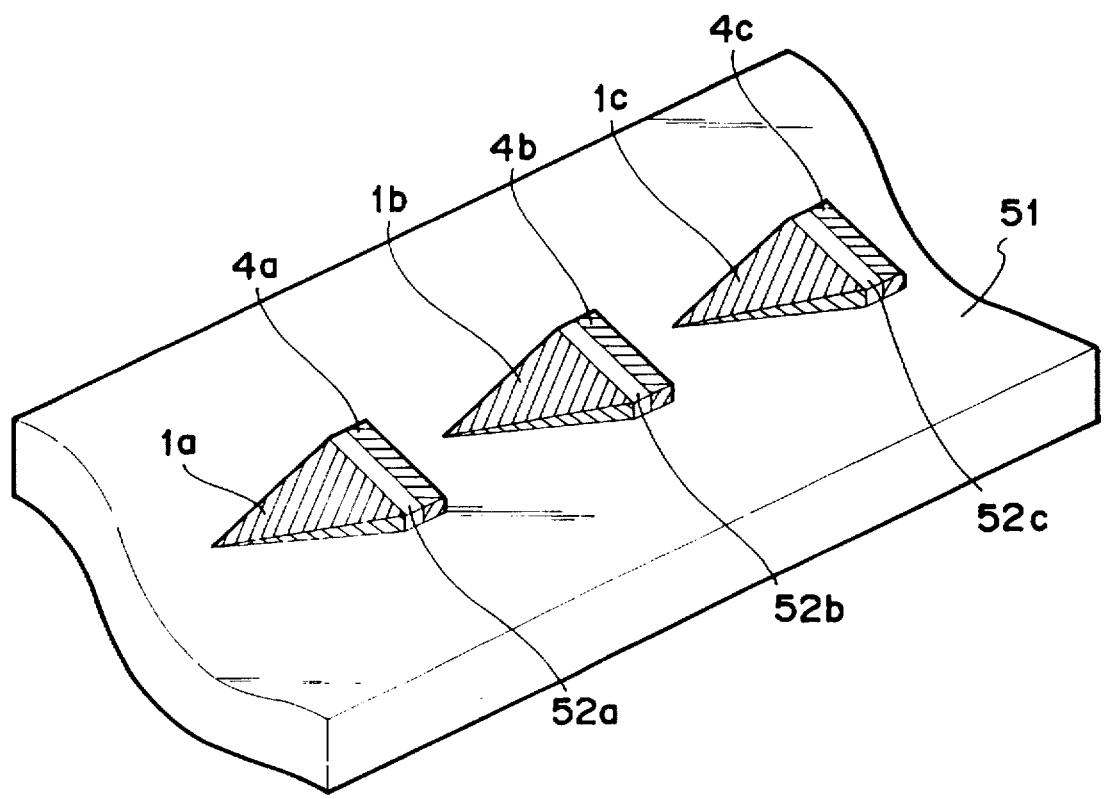
FIG. 6 illustrates an example of a plurality of pairs of electrodes employed in the present invention.
Figure 7:
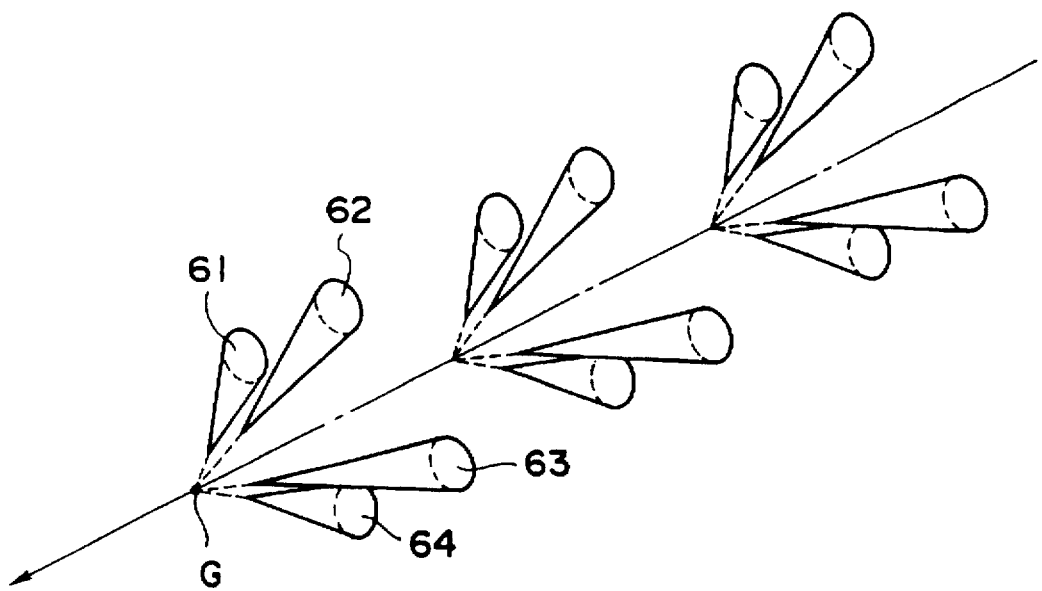
FIG. 7 illustrates another example of a plurality of pairs of electrodes employed in the present invention.

FIG. 6 and FIG. 7 show respectively an example employing a plurality of electrode pairs. In FIG. 6, patterns of wedge-shaped working electrodes 1a–1c combined respectively with counter electrodes 4a–4c are arranged in line on a substrate 51. The working electrode and the counter electrode in each pattern is insulated by interposition of an insulating film 52a–52c. The electric field is applied between the working electrode 1b and the adjacent counter electrode 4a, for example, and thereby the liquid flows toward the tip of the wedge on the substrate 51.

Figure 8:
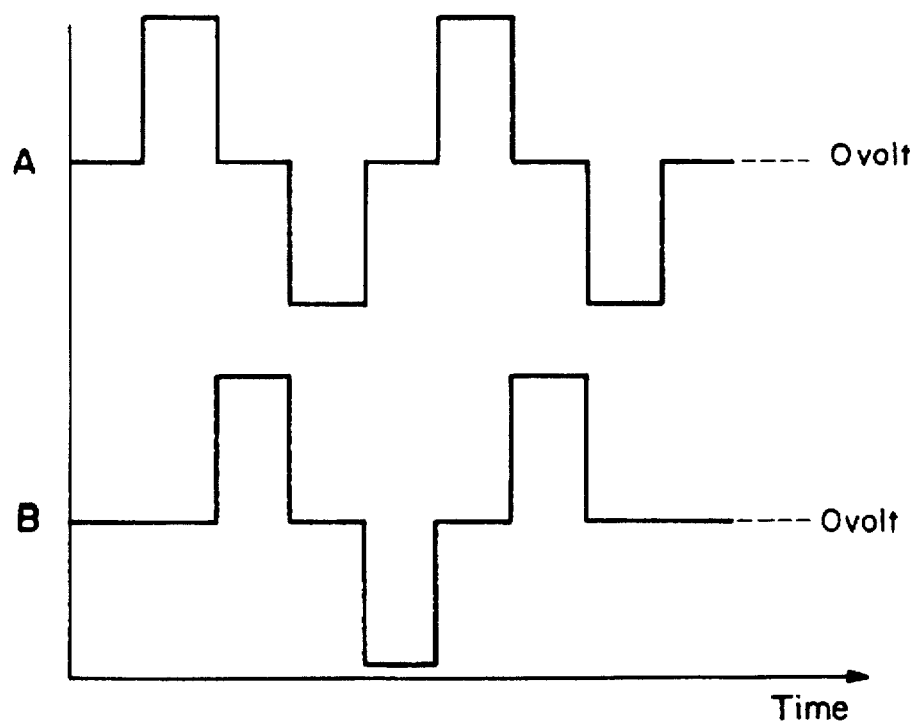
FIG. 8 is an example of wave-form of voltages applied to the plurality of pairs of electrodes of FIG. 7.

In FIG. 7, electrodes are constituted as an arrangement of a plurality of electrode units (3 units in the drawing), each unit being composed of four electrodes. The four electrodes in each unit are in a conical shape, and the tips are directed to one and the same point on the center axis (for example, point G in the drawing). As an example of voltage application to four electrodes of each unit, a voltage may be applied such that the electrodes 61 and 63 and the electrodes 62 and 64 are in the relation of a working electrode and a counter electrode. In this case, the voltage may be applied independently to the respective electrode pairs. For example, the voltage may be applied in wave-forms of A and B shown in FIG. 8. In such voltage application, the liquid flows mainly in the direction indicated by the arrow along the center axis.

The liquid-delivering apparatus of the present invention delivers a liquid according to the liquid-driving method of the present invention described above, and comprises an electrode pair having the aforementioned constitution, a means for feeding ionic conductive liquid to a gap between the electrode pair, and a power source for applying a voltage between the electrode pair.

In the delivery apparatus of the present invention, at least one electrode (working electrode) of the electrode pair is preferably placed in an internal space in the flow path for efficient delivery of the liquid. The space in the flow path is preferably a closed space filled with a liquid in order that the electromagnetic force exerted by the working electrodes to the ionic conductive liquid is utilized effectively for delivery of the liquid. If the space is open, swirl of the liquid may be caused, which may lower the delivery efficiency or may make the flow control difficult.

The sectional shape of the internal space is not limited particularly. When the tip of the working electrode is conical, for example, the internal space is preferably cylindrical corresponding to the conical shape. The flow path may be constructed from a known material such as glass, plastics, and ceramics.

The liquid-driving method of the present invention may be employed for agglutination reaction of a substance in a liquid sample with a biological substance capable of bonding specifically with the above substance in an ionic conductive liquid medium. The sample solution and a liquid dispersion of the biological substance in a liquid medium having ionic conductivity are introduced between the gap of an electrode pair, and a periodically changing voltage is applied between the pair of electrodes to agitate the liquid medium to cause an agglutination reaction. To conduct the agglutination reaction, there are provided a reaction cell having at least one pair of the electrodes and a power source for applying a periodically changing voltage to the electrode pair.

The above agglutination reaction may be utilized for measuring a concentration of a substance in a liquid sample by detecting the degree of agglutination of the reaction mixture. For this concentration measurement, there are provided a reaction cell having at least one pair of the electrodes, a power source for applying a periodically changing voltage to the electrode pair, and a means for detecting the degree of agglutination of the reaction mixture in the above reaction cell.

The substance in the sample solution and the biological substance are not limited, provided that the both substance are selectively bonded to each other.

The substance in the sample solution is exemplified by substances constituting living organism such as proteins, sugars, hormones, viruses, DNA, RNA, and so forth.

The biological substance as the reagent is a substance which exhibits biological specificity to the above substance. The biological specificity herein means a nature of forming a specific bonding such as antigen-antibody reaction, hybridization of DNA and RNA, avidin-biotin bond formation, and so forth.

The biological substance includes natural and synthetic peptides, proteins, enzymes, sugars, lectins, viruses bacteria, nucleic acids, DNA, RNA, antigens (including recombinant antigen), antibodies, etc. Further, the biological substance which is particularly important in clinical pathology includes serum proteins such as immune globulins (e.g., IgG, IgM, and IgE), complements, CRP, ferritin, $\alpha_1$ microglobulin, $\beta_2$ microglobulin, etc. and their antibodies; tumor labelled compounds such as carcinoembryonic antigen (CEA), prostatic acidic phosphatase (PAP), CA19-9, CA-125; etc. and their antibodies; hormones such as luteinizing hormone (LH), follicle-stimulating hormone (FSH), human chorionic gonadotropin (hCG), estrogen, insulin, etc. and their antibodies; virus infection-related substances such as HBV-related antigens (HBs, HBe, HBc), HIV, ATL, etc. and their antibodies; bacteria such as corynebacterium diphtheria, clostridium botulinum, mycoplasma, treponema pallidum, etc., and their antibodies; protozoa such as toxoplasma, trichomonas, leishmania, tripanosoma, plasmodium, etc., and their antibodies; medicines such as antiepileptics, e.g., phenytoin and phenobarbital, cardiovascular medicines, e.g., quinidine and digoxin, antiasthmatics, e.g., theophylline, antibiotics, e.g., chloramphenicol, and gentamicin, and their antibodies; enzymes, and exotoxin (e.g., styrelizine O), and their antibodies, and so forth. The biological substance is suitably selected from substances which causes antigen-antibody reaction with the substance in the above sample solution.

In the aforementioned antigen-antibody reaction, generally, agglutination of a substance in a sample solution with a biological substance occurs. The agglutination reaction may be caused with the biological substance supported on a surface of a fine particulate material depending on the kind and the amount of the substances.

The fine particulate material includes fine particulate biogenic materials, fine particulate inorganic materials, and fine particulate organic materials. The fine particulate biogenic materials are exemplified by red blood cells, and dispersion-treated bacteria such as staphylococcus and streptococcus. The fine particulate inorganic materials are exemplified by silica, alumina, and bentonite. The fine particulate organic materials are exemplified by homopolymers and copolymers of vinyl monomers such as styrene, vinyl chloride, acrylonitrile, vinyl acetate, acrylic esters, and methacrylic esters, butadiene copolymers such as styrenebutadiene copolymers, and methyl methacrylate copolymers, and lipid bimolecular layer liposomes.

The bonding of the biological substance onto the fine particulate material is made physically and/or chemically as described later. For the physical bonding, the surface of the fine particles is preferably hydrophobic. Particularly preferred hydrophobic fine particulate materials are fine particles of styrene homopolymers, vinyl copolymers mainly constituted of styrene units, and styrene-butadiene copolymers mainly constituted of styrene units.

The particle diameter of the above fine particulate materials are, in any case of fine particulate biogenic materials, fine particulate inorganic materials, and fine particulate organic materials, preferably in the range of from 0.05 µm to 10 µm, more preferably from 0.2 µm to 5 µm. If the particle diameter is less than 0.05 µm, the biological substances as the reagent cannot readily be dispersed on the surface. If the particle diameter is more than 10 µm, the stability of the reagent dispersion is impaired.

The biological substance is supported or fixed onto the surface of the fine particulate material by a known method: the method including ionic bonding, physical adsorption, and covalent bonding.

The ionic bonding is formed by bonding the biological substance such as protein, DNA, and RNA electrostatically onto the surface of the fine particulate material.

The physical adsorption is caused by hydrophobic bonding between the hydrophilic portion of the surface of the fine particulate material and the hydrophilic portion of the protein.

The ion bonding and the physical adsorption are formed by a simple bonding reaction, but are weak in bonding strength.

To the contrary, covalent bonding is formed by attaching a reactive functional group to at least one of the fine particle surface and the biological substance and bonding the substance onto the surface through the functional group, thereby strong bonding being obtained. The functional group for forming the covalent bonding between the fine particulate material and the biological substance includes an amino group, a hydroxyl group, a phosphoric acid group, a carboxylic group, the sulfhydryl group of cysteine, the imidazole group of histidine, the phenol group of tyrosine, the hydroxyl group of serine or threonine.

These functional groups are capable of reacting various groups such as diazonium salt group, an acid amide group, an isocyanate group, an active type of alkyl halide group, and an active type of ester group. Therefore, introduction of such a functional group onto the fine particle surface enables fixation of biological substance on the surface in various methods. The biological substances, especially those composed of protein have a high-order structure retained by a relatively weak bonding such as hydrogen bonding, hydrophobic bonding, or ionic bonding, and are readily destroyed. Therefore, the fixation is preferably conducted under mild conditions without treatment with a strong acid or a strong alkali at a high temperature.

On method of fixation reaction under mild conditions is fixation by use of a bifunctional crosslinking agent which is capable of reacting with the functional groups of the fine particulate material and of the biological substance. The bifunctional crosslinking agent is exemplified by carbodiimides represented by the general formula R—N=C=N—R', dialdehydes represented by the general formula CHO—R—CHO, diisocyanates represented by the general formula O=C=N—R—N=C=O (in the general formulas, R, and R' denote independently a substituted or unsubstituted alkyl, aryl alkylaryl, or arylalkyl group).

The sample solution containing a substance to be determined and the fine particulate material supporting a biological substance as the reagent are dispersed in an ionic conductive liquid medium.

The ionic conductive liquid medium includes water containing a dissolved electrolyte, or mixed solvent composed of the water and an organic solvent miscible with water such as alcohols and ketones. In the liquid, the electrolyte is required to be partly or wholly dissociated into ions for the ionic conductivity. The liquid medium may contain an additive such as a pH buffering agent, a protein, a surfactant, a water-soluble polymer and the like.

Antigen-antibody reactions and hybridization tend to be affected by the pH of the solvent. Therefore, the pH buffering agent is generally added to the reaction medium: the pH buffering agent including phosphate salts, tris, HCl buffer, and the like. The protein is added to inhibit non-specific reaction: the protein including bovine serum albumin, and gelatin. The surfactant and the water-soluble polymer are effective as a dispersion aid of the reagent, including nonionic and anionic surfactants like Tween 20, polyvinyl alcohols, polyacrylamides, polyacrylic acid salts, hydroxyethylcellulose, etc. Such additives are used in such amounts that the agglutination reaction is not retarded.

The aforementioned reagent is diluted with the above liquid medium suitable depending on the kind and the amount of the substance in the sample solution. The solid matter concentration in the diluted reagent is adjusted depending on the type and the size of the reaction cell employed, and generally and preferably in the range of from 0.01% to 5%, more preferably from 0.05% to 2%.

The sample solution containing the substance to be measured, and the ionic conductive liquid medium containing the reagent dispersed therein are introduced into a space between an electrode pair. A periodically changing voltage is applied between the electrode pair to exert an electromagnetic force to the ionic conductive liquid in the vicinity of the electrode to agitate the liquid medium, thereby causing an agglutination reaction.

The agglutination reaction by use of the liquid-driving method of the present invention is promoted by agitation of the liquid medium by exerting an electromagnetic force to the ionic conductive liquid in the minute region around the electrode. Thereby the agglutination reaction can be carried out simple with a small amount of a liquid (dispersion medium, sample solution, etc.).

Figure 9:
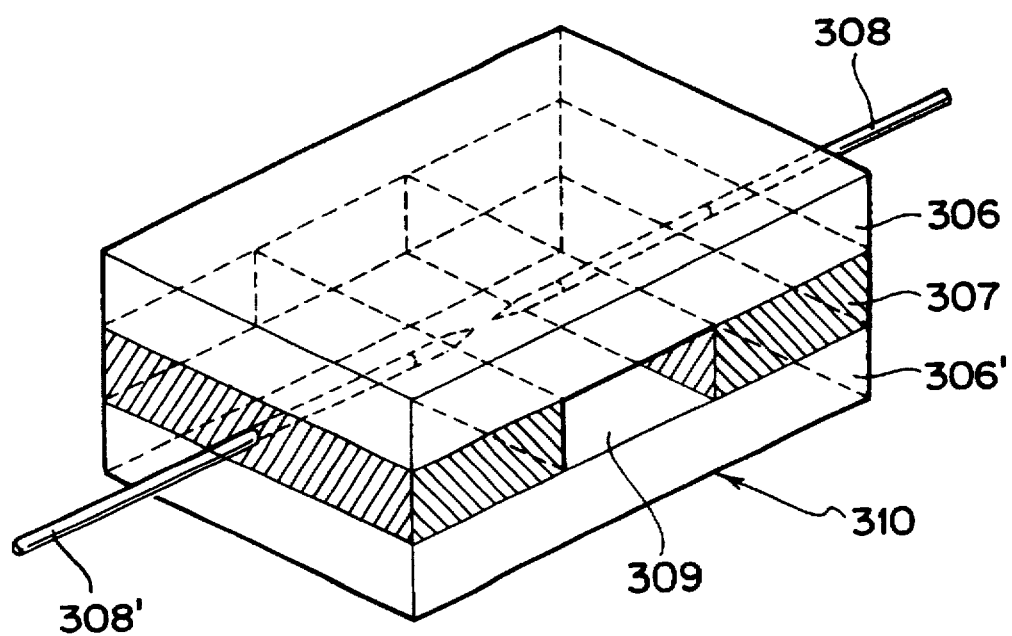
FIG. 9 illustrates roughly a apparatus for an agglutination reaction employing the liquid-driving method of the present invention.

FIG. 9 illustrates an example of constitution of an agglutination reaction apparatus having electrode constitution shown in FIG. 5. The reaction cell 310 is constructed of glass substrate 306, 306', spacers 307, and has electrodes 308, 308' having a tip in a conical shape, and a liquid introduction portion 309.

With this apparatus, a sample solution containing a substance to be measured and an ionic conductive liquid medium containing a biological substance dispersed therein as the reagent are introduced to the liquid introduction portion, and an AC voltage is applied between the electrode 8, 8' by a power source (not shown in the drawing). Thereby, the liquid medium in the vicinity of the electrodes 8, 8' is driven as shown in FIG. 5, resulting in agitation of the liquid medium to promote the agglutination reaction. By changing the voltage level and frequency of the applied voltage, the agitation efficiency is changed and thereby the reaction rate of the reaction velocity can be controlled.

The method and the apparatus for concentration measurement are described below which employ the agglutination reaction method and the agglutination reaction apparatus described above.

The method of concentration measurement detects the degree of agglutination of a reaction mixture of the aforementioned agglutination reaction. Specifically, the change of the output of a detector may be measured with progress of the agglutination reaction, or the output of a detector may be measured on completion of the agglutination reaction. Further, quantitative determination is feasible by preparing a calibration curve with known samples. The degree of the agglutination of the reaction mixture is preferably detected in the agitated region between the pair of electrodes placed in the reaction cell.

The measurement may be conducted while the voltage level or the frequency of the applied power is being changed to change the efficiency of agitation.

The means for measurement of degree of agglutination of the reaction mixture with the aforementioned concentration measurement apparatus includes optical methods such as measurement of transmitted light intensity and measurement of scattered light intensity from the reaction cell, and electrical means such as measurement of impedance as well as visual observation. In the optical means, the light source includes lamps such as halogen lamps and Xe lamps, and laser light sources such as He—Ne laser, and semiconductor laser. The light receiving element includes photomultipliers, photodiodes, phototransistors, and so forth, and the output is amplified, if necessary, by an operational amplifier.

The liquid-driving method of the present invention enables detection of a minute amount of a substance by forming an adduct by reaction of the substance and/or one or more detection reagents with a solidified reagent which is a biological substance supported on a solid material and is capable of specifically combining with the minute substance in the sample. In this detection, the sample solution and the detection reagent solution are ionic conductive solution. The ionic conductive liquids are introduced into the gap between the electrode pair, and a periodically changing voltage is applied between the electrode pair to agitate the liquids. Thereby a reaction is allowed to proceed among the solidified reagent, the minute substance, and the detecting reagent.

After the reaction, cleaning of the reaction cell may be conducted such that a cleaning liquid having ionic conductivity is introduced between the pair of the electrode, and a periodically changing voltage is applied between the electrode pair to agitate the cleaning solution. In order to conduct the above detection, there are provided a reaction cell provided with at least one pair of electrodes, a power application means, and a detection means for detecting a labelled substance in the reaction adduct.

The minute substance in the sample solution and the biological substance in the above detection are not specially limited. The ones already mentioned as the examples of the substance in the sample solution and the biological substance are suitably used in the detection.

The biological substance in the present invention is supported (or fixed) on a solid material to form a solidified reagent. The solid material is not specially limited provided that it is capable of fixing the biological material according to the method described below. The solid material may be glass or a plastic material constructing the reaction cell, or may be a filter of a fine particulate matter made of glass fiber or cellulose. The fine particulate solid material is useful which are exemplified before in the agglutination reaction as the fine particulate material for supporting the biological substance.

The biological material is fixed on the surface of the solid material by ionic bonding, physical adsorption, or covalent bonding in the same manner as described before.

The detection may be conducted by the methods exemplified below (see "Kensa to Gijutsu (Examination and Technique)" Vol. 16, No. 7, p. 591 (1988)).

(Sandwich Technique)

A minute amount of a substance is detected by reaction of a solidified reagent and a detection reagent with interposition of the minute substance to form a reaction adduct and detecting the resulting reaction adduct. In the sandwich technique, the detection reagent may be a biological substance which exhibits biological specificity to the minute substance similarly as the solidified reagent.

(Competition Technique)

A minute amount of a substance in the sample solution and a detection reagent are reacted competitively with the solidified reagent to form two kinds of reaction adducts of (the solidified reagent and the minute substance), and (the solidified reagent and the detection reagent), and the reaction adduct composed of the solidified reagent and the detection reagent is detected. The minute substance is determined complementarily.

In the competition technique, the detection reagent may be another minute substance (which is required to be labelled to be distinguished from the minute substance to be measured), or a substance which exhibits biological specificity to the solidified reagent similarly.

In either method the sandwich technique or the competition technique, the reaction adduct containing the detection reagent needs to be detected. This detection is generally conducted by introduction of a labelled compound detectable optically or radiochemically. The labelled compound may be introduced chemically to the detection reagent preliminarily. Otherwise a labelled compound is linked specifically to the detection reagent in the reaction adduct, and another labelled detection reagent is further bonded thereto. The labelled compound includes conventional radioactive isotopes, dye, and enzymes.

In this detection, the sample solution and/or the detection reagent solution is ionic conductive. These solutions are introduced between the electrode pair, and the liquid mixture is agitated by electromagnetic force produced by application of a periodically changing voltage between the electrode pair.

When cleaning is necessary after the above reaction, the cleaning can be practiced efficiently in a shorter time by using an ionic conductive cleaning solution and agitating the solution in the same manner as in the reaction of the sample solution and the reagent solution.

Figure 10A:
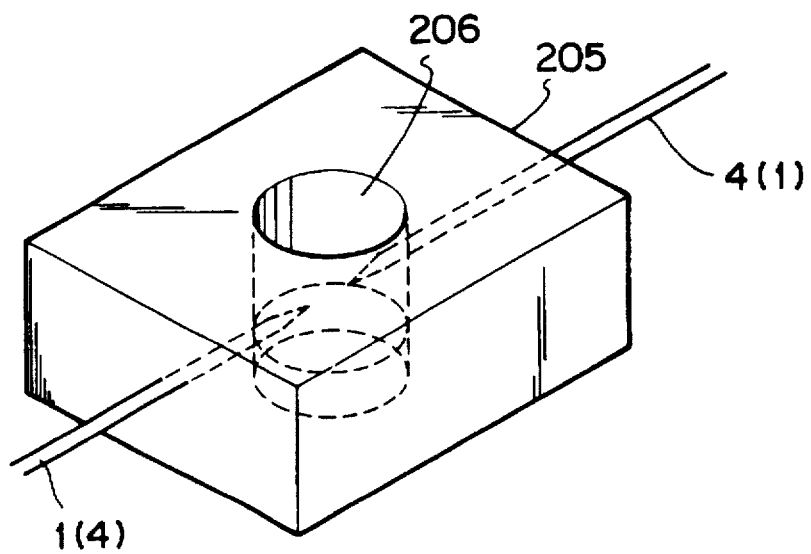
FIGS. 10A and 10B illustrates an example of a reaction cell for the detection apparatus utilizing the liquid-driving method of the present invention.
Figure 10B:
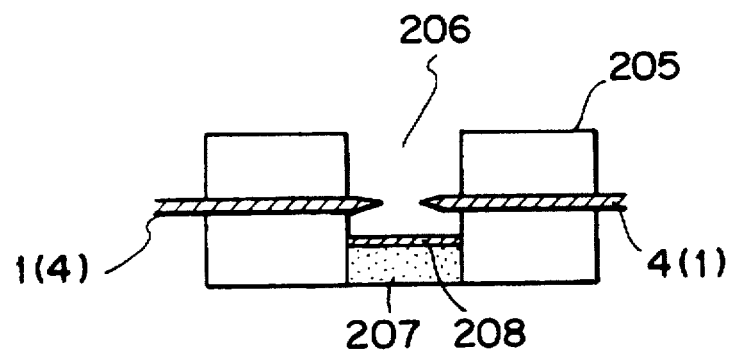

FIGS. 10A and 10B illustrate an example of constitution of the reaction cell used as the detection apparatus. FIG. 10A is a perspective view thereof, and FIG. 10B is a cross-sectional view thereof.

In the drawings, a reaction cell 205 has a liquid retaining portion 206 in a cylindrical shape. A filter 207 is placed at the bottom of the liquid-retaining portion 206. A reagent region 208 is provided on the upper face of the filter 207. Needle-shaped electrodes 1 and 4 are provided at the liquid-retaining portion 206 as shown in FIG. 5, and thereto voltage is applied by an external power source (not shown in the drawings). The reaction cell 205 may be made of a known material such as glass, synthetic resins, and metals, or a composite thereof. When the reaction cell is exchanged in correspondence with the kind of the reagent region 208, a synthetic resin material is preferred which is light-weight and produced at a low cost. The reagent region 208 has a reagent which is capable of reacting with the minute substance. This reagent may exist directly on the upper face of the filter 207, or may be supported on an intermediate medium like glass fiber and fine particulate polymer which is placed on the filter 207.

Figure 11:
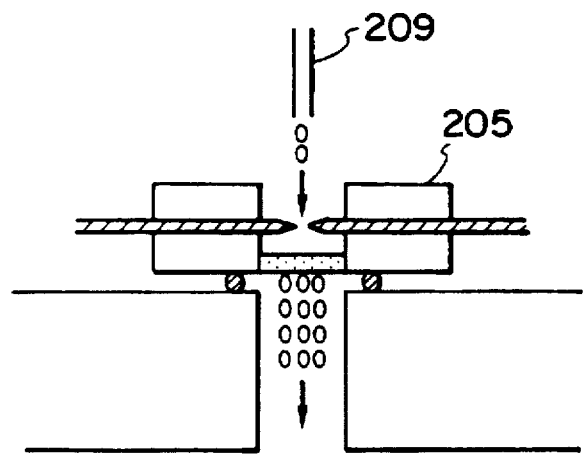
FIG. 11 illustrates an example of feeding and discharging of the liquid in the detection apparatus of FIGS. 10A and 10B.

Thus, a biological substance capable of reacting specifically with a minute substance in a sample liquid is supported on a filter 207 to form a solidified reagent. Then a sample liquid, a detection reagent liquid, a cleaning liquid, etc. are fed to the liquid-retaining portion 206. For example, the liquids are dropped to the liquid-retaining portion 206 in a predetermined amount by use of a dispenser 209 as shown in FIG. 11. The liquid is removed from the liquid-retaining portion 206 by suction through the filter 207. Different dispensers 209 are used corresponding to the sample liquid, the detecting liquid, the cleaning liquid, etc. If desired, the tip of the dispenser may be disposable.

In the reaction step of sandwich technique, for example, firstly a sample liquid is dropped from the dispenser 209 to the liquid-retaining portion 206 to allow the entire face of the reagent region 208 on the filter and the electrodes 1,4 to be dipped in the sample liquid. (Suction is not applied in this stage.) Then, an AC voltage is applied between the electrodes to agitate the sample liquid and to link the minute substance in the sample liquid to the reagent in the reagent region 208. In this step, it is possible to control the temperature of the reaction cell 205 to promote the reaction between the reagents. The temperature depends on the kind of the reaction, and is preferably in the range of from 5° C. to 100° C., more preferably from 20° C. to 60° C. Generally, the time required for the reaction depends on the used reagent on the reagent region 208, the object of the analysis, pH, temperature, etc. For example, the reaction time is several minutes for immune reactions, and several hours for hybridization of DNA. Therefore, the aforementioned conditions are selected preferably to shorten the time for the reaction as much as possible.

After the reaction, suction is applied from the back face of the filter to remove the excess sample liquid.

Then suction is stopped, and a labelled reagent liquid which contains a reagent capable of reacting with the minute substance and labelled with fluorescent dye or the like is dropped from the dispenser 209 to the liquid-retaining portion 206, to cause the reaction, and then the reagent liquid is removed in the same manner as above.

Cleaning is conducted in a similar manner by dropping a cleaning liquid from the dispenser 209 to the liquid-retaining portion, and removing excess sample liquid and the excess labelled reagent liquid. The cleaning may be repeated several times, if necessary.

Figure 12:
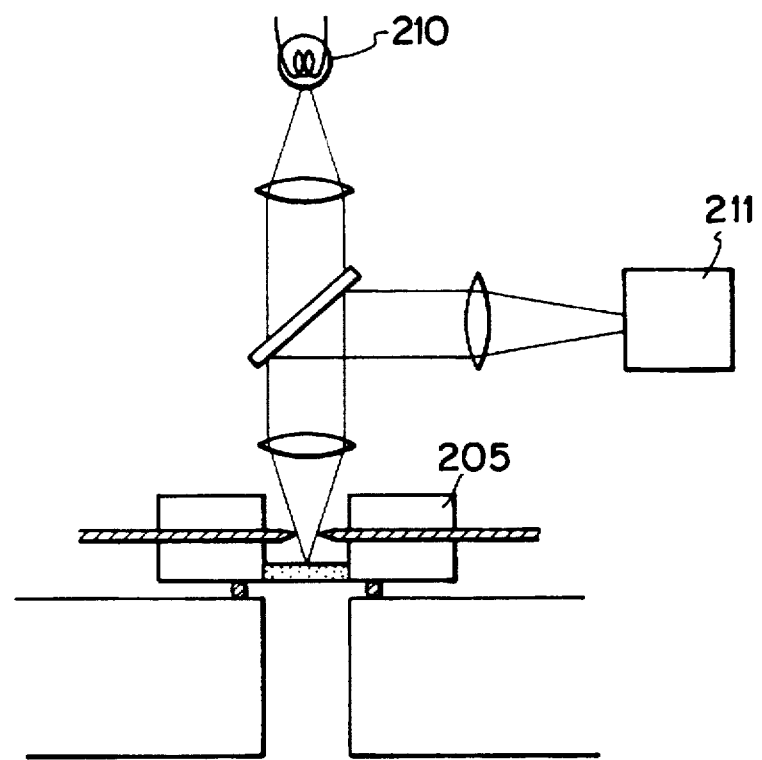
FIG. 12 illustrates an example of optical detection in the detection apparatus of FIGS. 10A and 10B.

Consequently, a reaction adduct is formed by linking of the labelled reagent to the reagent region on the filter through the minute substance having been contained in the sample liquid. The presence of the formed reaction adduct is detected, for example, as shown in FIG. 12 by incident light from a light source 10 to the reagent region on the filter and detecting the fluorescent light or reflected light from the reagent region by light detector 211, thereby the minute substance in the sample liquid is detected. The detection region where light is illuminated is preferably the agitation region between the pair of the electrodes in the reaction cell.

In the competition technique, a sample liquid and a labelled reagent liquid are simultaneously dropped to the liquid-retaining portion 206, and cleaning and detection is conducted in the same manner.

The minute substance in an unknown sample liquid can be quantitatively determined by deriving a calibration curve of the fluorescent light intensity by use of a standard sample liquid of known concentration of the minute substance.

The light source 210 may be a non-coherent light source such as xenon lamps, halogen lamps, tungsten, lamps, LED, and the like, or may be a coherent light source such as laser. The light detector 211 may be a photomultiplier, a photodiode, a photocell, or the like.

Fine particles in a liquid medium can be detected by the liquid-driving method. That is, a ionic conductive liquid medium is introduced to a gap of a pair of electrodes, a periodically changing voltage is applied between the electrodes and fine particles moving around in the vicinity of the electrode are detected. To conduct the detection, there are provided a measurement cell having the aforementioned electrode pair, a power source for applying voltage between the electrode pair, and a detection means for detecting the fine particles moving around the electrode.

The fine particles detectable include cells such as erythrocytes, and leucocytes, biological fine particles such as liposome, and fine particulate microorganisms such as fungi and bacteria such as colon bacterium and yeast. Further the fine particles include giant molecule such as DNA, RNA, and protein, fine particulate polymers composed of polystyrene, and acrylics, and fine particulate inorganic materials such as ferrite, glass, carbon, and silica.

When the above fine particles dispersed in an ionic conductive liquid medium is introduced between a pair of electrodes and a periodically changing voltage is applied between the electrodes, the fine particles are driven to move around in the vicinity of the electrode by an electromagnetic force acting on the ionic conductive liquid in the vicinity of the electrode.

Figure 13:
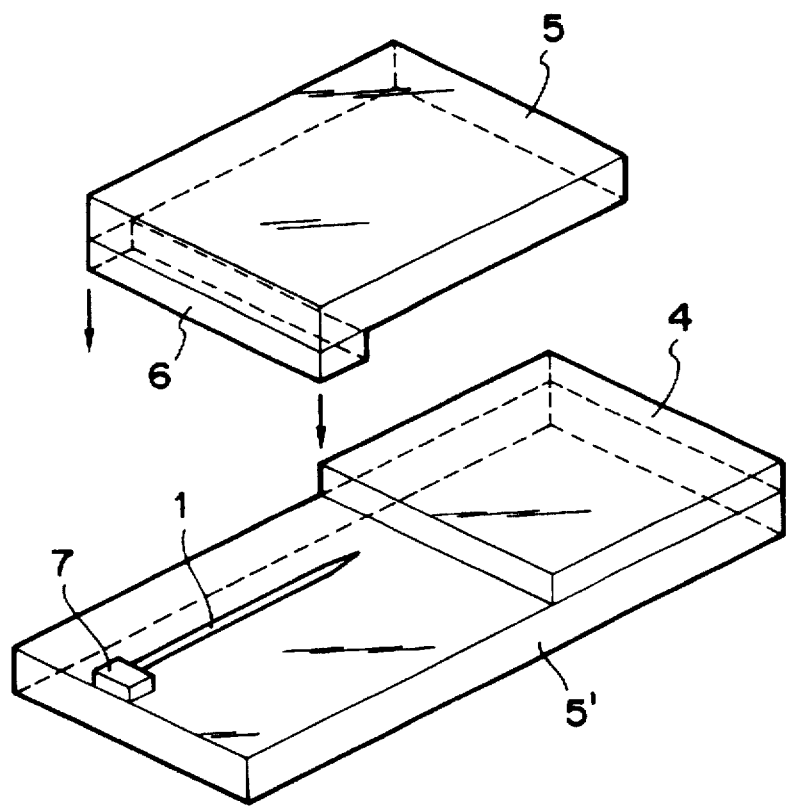
FIG. 13 is a perspective view of an example of a constitution of a measurement cell employed in a fine particle detection apparatus utilizing the liquid-driving method of the present invention.

FIG. 13 illustrates an example of constitution of a measurement cell for the above detection of fine particles. This measurement cell has substrates 5, 5' and a needle-shaped electrode (working electrode) 4 and a counter electrode 4 are held between the substrates. The two substrates is kept at a certain distance by a gap member 6. The liquid medium containing the fine particles is introduced into this gap. A terminal 7 is provided for the needle-shaped electrode 1.

Figure 14:
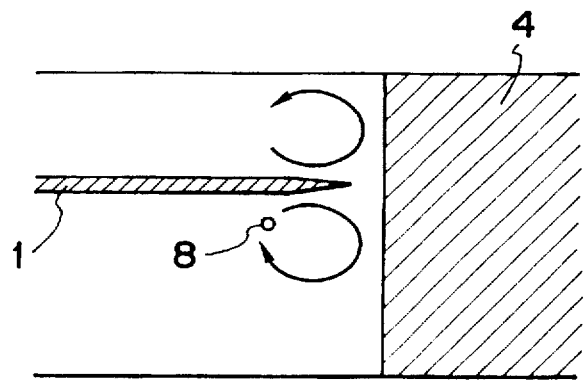
FIG. 14 illustrates a state of circulating motion of fine particles in the measurement cell of FIG. 13.

FIG. 14 illustrates the flow of the liquid medium under application of a periodically changing voltage between the electrodes 1, 4 of the measurement cell as viewed from the top side of the cell.

In the vicinity of tip of the needle-shaped electrode 1, the liquid moves around as shown by the arrow marks in the drawing, and consequently the fine particle 8 in the liquid also moves around the needle-shaped electrode.

The orbital of the movement of the fine particles is controllable by the shape of the cell, particularly in the vicinity of the electrode (e.g., distance between the substrates, the shape of the counter electrode, etc.

The interval of the fine particles can be controlled by adjusting the concentration of the fine particles in the liquid medium introduced into the cell, even when many fine particles are moving around.

The detectable size of the fine particles depends on the specific gravity of the fine particles. If the specific gravity of the fine particle is at approximately the same level as that of the dispersing liquid medium (except for the same level), the particle diameter is preferably not larger than 100 µm, preferably not larger than 50 µm, more preferably not larger than 10 µm. Fine particles having a larger particle diameter than the above value cannot readily be moved around in the vicinity of the working electrode because of larger action of gravity or buoyancy. On the other hand, when the circulating motion of the moving fine particles is detected by an optical means, the particle diameter is required to be larger than the wavelength of the detecting light.

The method of detecting the circulating fine particles is described below specifically.

Figure 15:
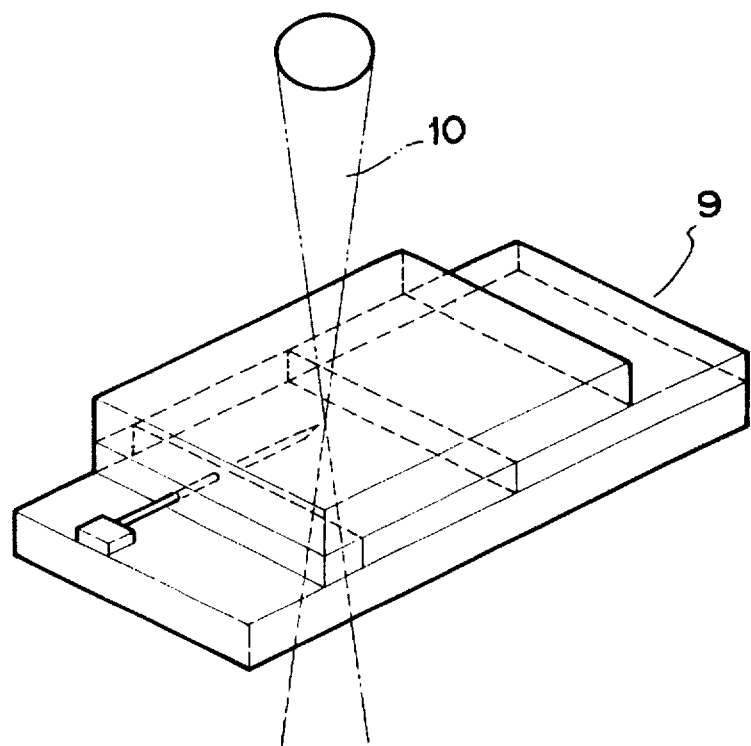
FIG. 15 illustrates a state of projection of detecting light for optically detecting fine particles with the measurement cell of FIG. 13.

FIG. 15 shows a positional relation of detecting light to the measurement cell in optical detection of circulating fine particles. Detecting light 10 is illuminated from the top face side of the measurement cell 9 to a region in a circulation orbital from a light source (not shown in the drawing).

Figure 16:
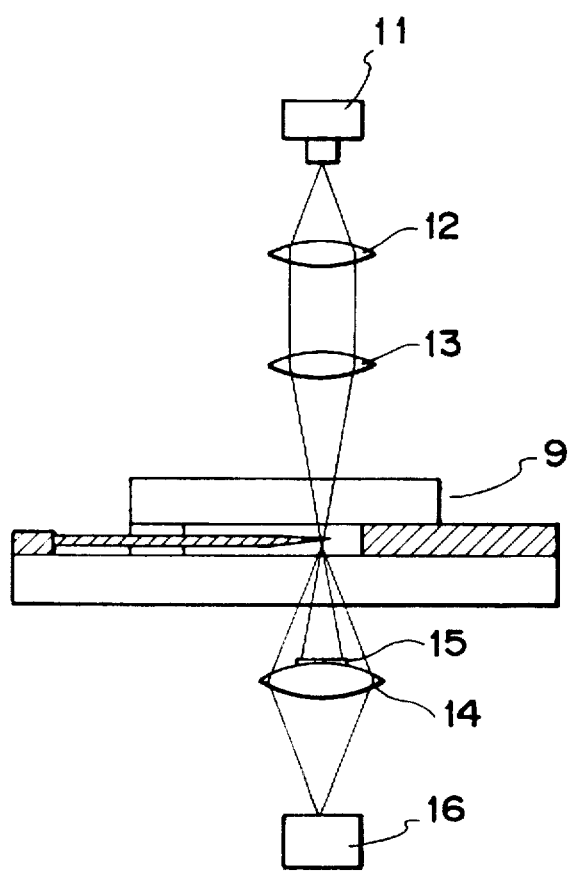
FIG. 16 illustrates an example of the entire constitution of a fine particle detection apparatus employing the liquid-driving method of the present invention.

FIG. 16 illustrates an example of constitution of a fine particle detection apparatus of the present invention having an optical detection means. In this apparatus, the light from a light source 11 is condensed by lenses 12, 13 in a cell 9, transmitted light is intercepted by a beam stopper 15 on a lens 14, and scattered light only is detected by light detector 16. The fine particles passing through the light-incident region scatter the incident light and the scattered light is detected by the light detector. The size of the particles or occurrence of agglutination is measured by the intensity of the detected scattered light.

The light source 11 may be a non-coherent light source such as xenon lamps, halogen lamps, tungsten, lamps, LED, and the like, or may be a coherent light source such as laser. The light detector 16 may be a photomultiplier, a photodiode, a photocell, or the like.

The present invention is described in more detail by reference to Examples.

EXAMPLE 1

Figure 17:
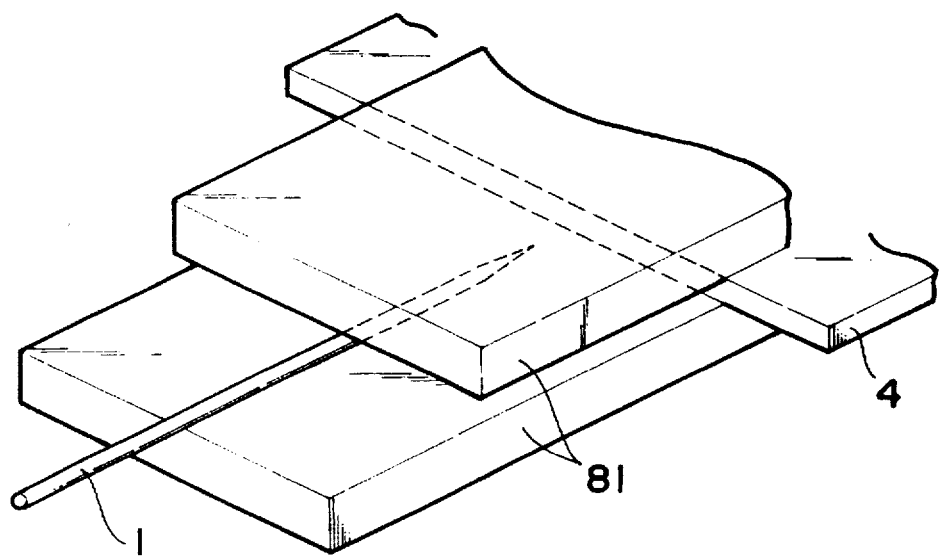
FIG. 17 is a perspective view of the constitution of the cell in Example 1.

A liquid flow experiment was conducted with a cell shown in FIG. 17.

The working electrode 1 was made of gold-tungsten alloy having a diameter of 50 µm with a conical tip having a diameter of 10 µm or less. The counter electrode was made of a stainless steel plate of 250 µm thick. The counter electrode 4 was held between two sheets of slide glass 81 of 1 mm thick. The distance between the counter electrode and the working electrode was fixed at 100 µm.

Figure 18:
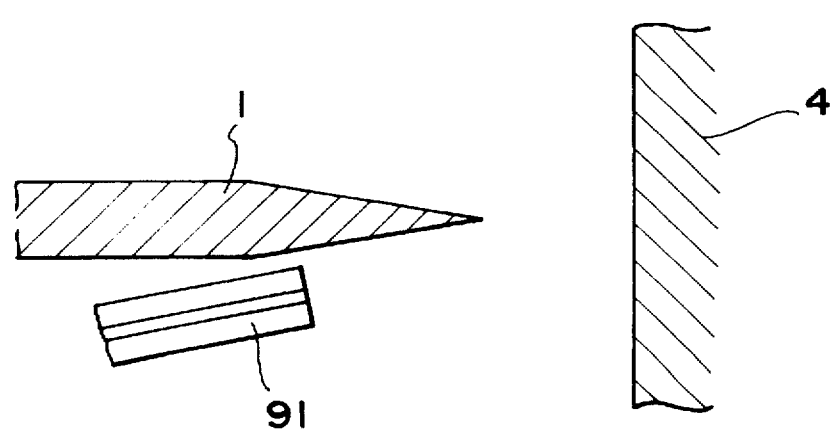
FIG. 18 illustrates arrangement of glass capillary in Example 1.

The cell was filled with an aqueous potassium chloride solution (electric conductivity: 1 mS/cm), and thereto another aqueous potassium chloride solution containing a dye dissolved therein was introduced by employing the constitution shown in FIG. 18. In FIG. 18, a glass capillary 91 having inside diameter of about 10 µm is provided in proximity to the tip of the working electrode 1. In this capillary, the dye-containing aqueous potassium chloride solution is introduced. The dye-containing solution in the capillary 91 is discharged from the glass capillary into the cell by a microsyringe pump.

Figure 19:
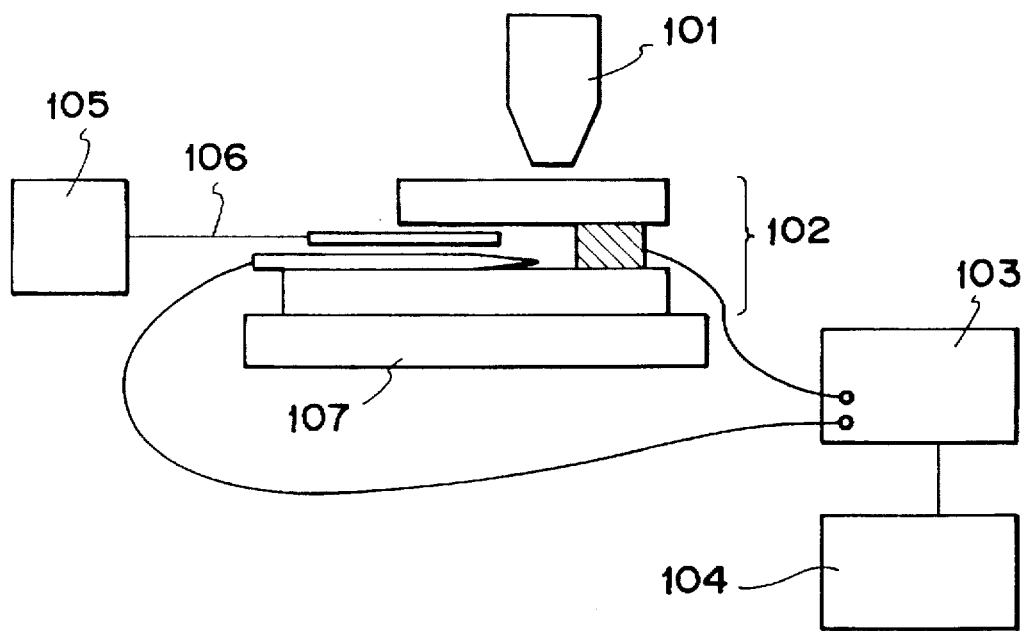
FIG. 19 illustrates constitution of the apparatus for observing the flow of the liquid in Example 1.

FIG. 19 illustrates constitution of an apparatus for observing flow of the liquid in the cell. The apparatus in FIG. 19 comprises an objective lens 101, a cell 102, a bipolar amplifier 103, a wave-form generator 104, a microsyringe pump 105, a joint 106, and a microscope stage 107.

Figure 20:
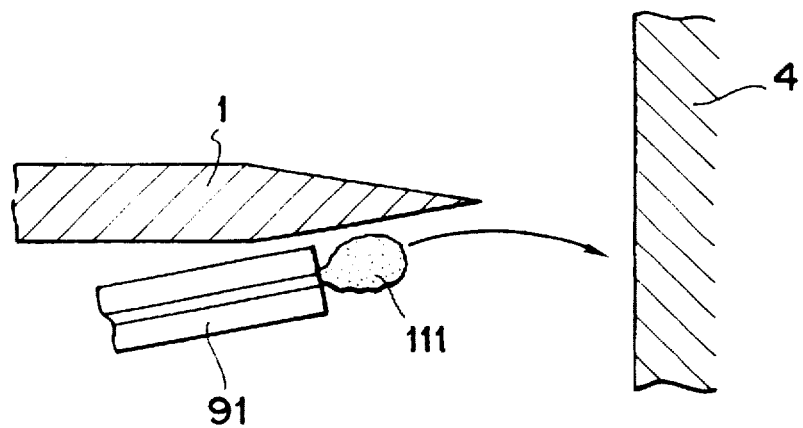
FIG. 20 illustrates the state of the dye in the liquid in Example 1.

Firstly, the dye solution was discharged in a small amount from the tip of the glass capillary 91 by use of the microsyringe pump 105. Then a rectangular wave voltage of ±9 V and 1 MHz was applied between the working electrode 1 and the counter electrode 4, whereby the dye discharged from the capillary tip was made to flow as shown by the arrow mark in FIG. 20. During this operation, bubble formation caused by electrolysis of water was not observed.

EXAMPLE 2

Figure 21:
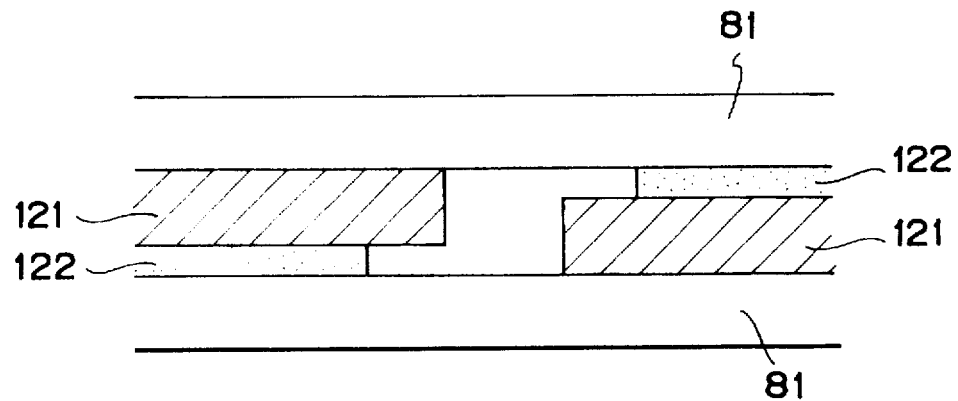
FIG. 21 is a cross-sectional view of the constitution of the cell of Example 2.

A liquid flow experiment was conducted with a cell shown in FIG. 21. The two electrodes 121 constituting the electrode pair were made by a stainless steel of 250 µm thick, and were fixed by slide glass sheets 81 of 1 mm thick and a PET film spacer 122 of 100 µm thick.

Figure 22:
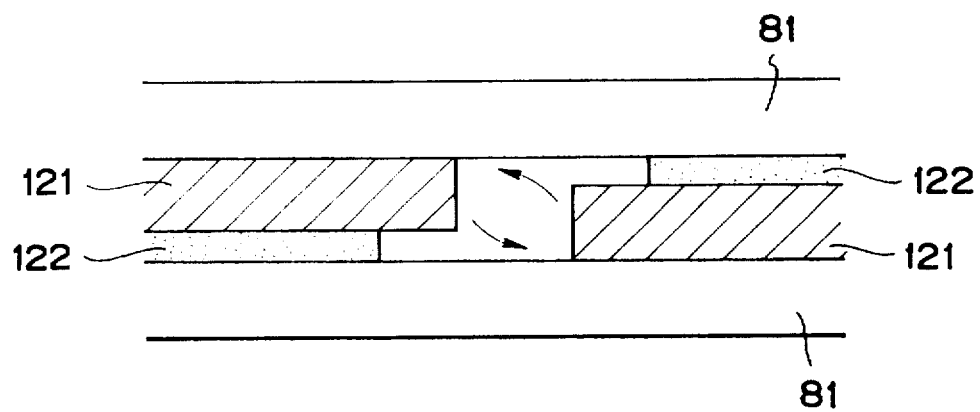
FIG. 22 illustrates the flow of the dye in the liquid in Example 2.

With this cell, and by using the same liquid and apparatus as in Example 1, a voltage of ±9 V and 1 MHz was applied between the two electrodes, whereby the dye flowed in the direction as shown by the arrow marks in FIG. 22. In this Example also, bubble formation caused by electrolysis of water was not observed.

EXAMPLE 3

Figure 23:
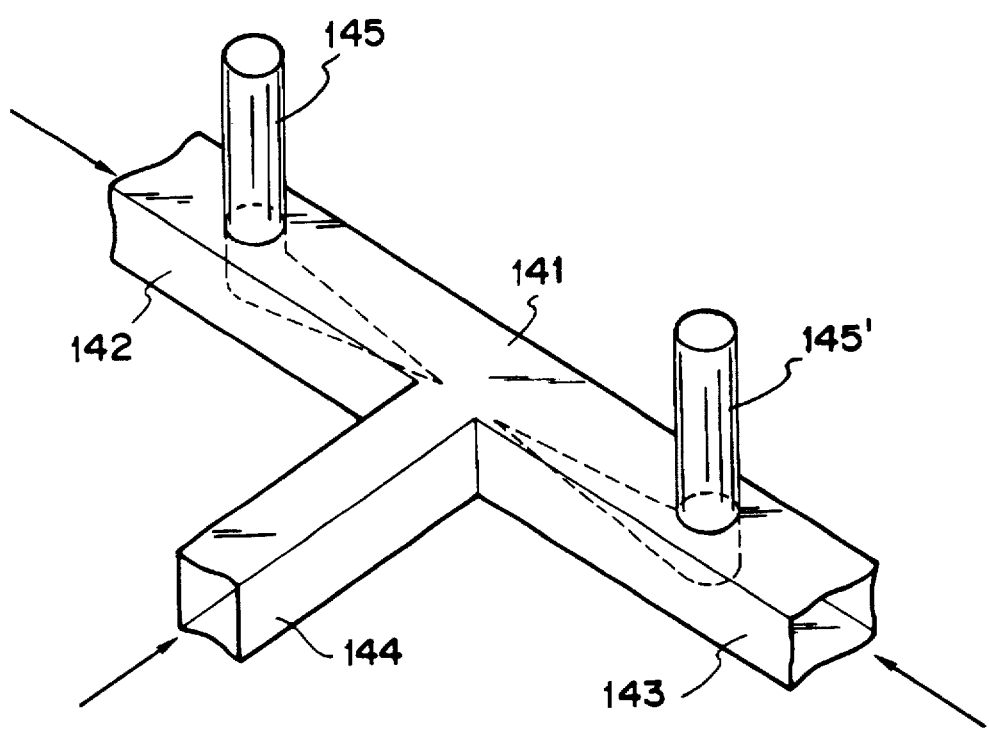
FIG. 23 is a perspective view of the liquid mixing-agitating apparatus in Example 3.

Two kinds of liquids were driven, mixed, and discharged with constitution shown in FIG. 23.

In FIG. 23, the numeral 141 denotes a flow cell having a T-shaped duct (duct portions 142 and 143 having a size of 300 µm×400 µm, duct portion 144 having a size of 300 µm×300 µm) made of an acrylic resin, and therein electrodes 145, 145' made of a gold-tungsten alloy wire having conical tip (wire diameter: 100 µm, tip diameter: 10 µm or less) are placed as shown in the drawing. The gap between the tips of the electrodes is 200 µm.

An aqueous calcium chloride solution and an aqueous sodium sulfate solution (both having electric conductivity adjusted to 0.5 mS/cm by addition of potassium chloride) were fed respectively to the duct portion 142 and the duct portion 143. A voltage of ±9 V and 1 MHz was applied between the wire electrodes 145, 145', and the liquid was discharged from the duct portion 144 by sucking with a pump means (not shown in the drawing).

In this experiment, the aqueous calcium chloride solution and the aqueous sodium sulfate solution were efficiently agitated at the joining portion of the T-shaped flow cell, and the precipitate of calcium sulfate formed by the reaction was continuously discharged from the duct portion 144. The reaction efficiency and the particle size of the precipitation of calcium sulfate were controlled by adjusting the rate of discharge from the duct portion 144 and by adjusting the voltage applied between the wire electrodes.

EXAMPLE 4

Figure 24:
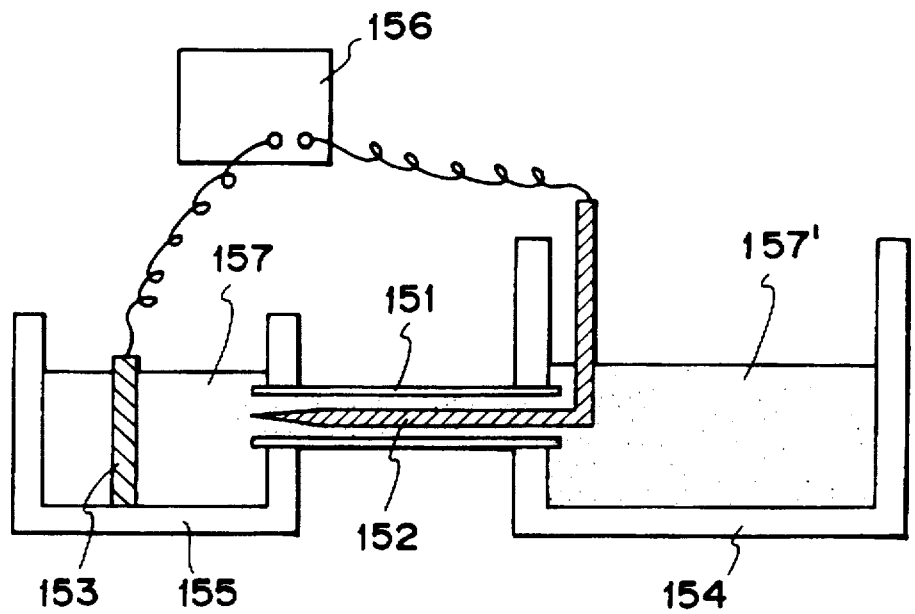
FIG. 24 illustrates the entire constitution of the delivery apparatus of Example 4.
Figure 25:
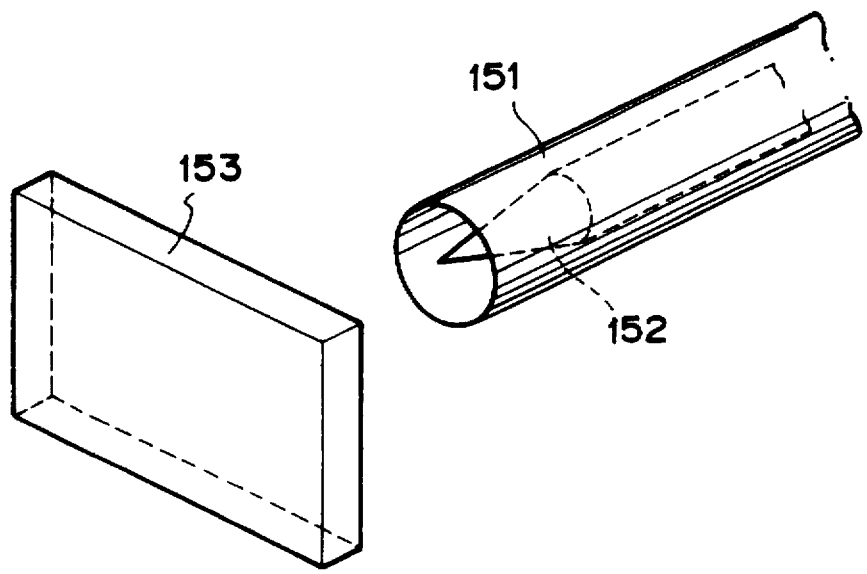
FIG. 25 is an enlarged perspective view of the electrode pair and the flow path of the apparatus of FIG. 24.

A liquid delivery apparatus of the present invention was prepared. FIG. 24 illustrates the entire construction of the apparatus of this Example. FIG. 25 is an enlarged drawing of the electrode pair and the flow path of the apparatus.

As shown in FIG. 25, a gold-tungsten alloy wire 152 having a conical tip (diameter: 50 µm, tip diameter: 10 µm or less) as the working electrode was inserted into a glass capillary 151 (inside diameter: 100 µm), and the position was adjusted such that the tip of the wire and the open end of the glass capillary comes onto approximately one and the same plane. A stainless steel plate 153 of 250 µm thick was placed as the counter electrode at the distance of 200 µm outside from the open end of the glass capillary 151.

As shown in FIG. 24, a liquid-supplying vessel 154 and a liquid-receiving vessel 155 were connected by a glass capillary 151 of 1 m long. In the liquid-receiving vessel, a stainless steel plate 153 shown in FIG. 16 was placed, and the gold-tungsten wire 152 was lead from the liquid-supplying vessel through the glass capillary 151 to the external liquid. The stainless plate 153 and the gold-tungsten wire were respectively connected to the power source 156. The liquid 157 was an aqueous potassium chloride solution (electric conductivity: 1 mS/cm), and the liquid 157' in the liquid-supplying vessel contained a small amount of dye. When voltage was not applied between the gold-tungsten wire and the stainless steel plate, no movement of the liquid through the glass capillary 151 occurred. When a rectangular wave voltage of 1 MHz and ±11 V was applied by turning power source on, movement of the liquid was observed from the liquid-supplying vessel through the glass capillary to the liquid-receiving vessel.

In this experiment, bubble formation at the electrodes caused by electrolysis of water was not observed. By changing the applied voltage, it was found that the rate of movement changed and the delivery rate could be controlled.

EXAMPLE 5

A dispersion of polystyrene latex particles immobilized to human CRP antibody (particle diameter: 1.2 μm, made by Denka Seiken K. K.) in PBS (solid content 1.2 mg/ml), and standard CRP serum (made by Kyowa Yuka K. K.) as a sample liquid were mixed to give a serum concentration of 5 μg/ml, and 1 μl of the mixture was introduced to the reaction cell having the constitution shown in FIG. 9.

The reaction cell was constructed by two sheets of slide glass 206, 206' of 1 mm thick with a spacer 207 held therebetween to form a liquid introduction portion 209. The electrodes 208, 208' were made of a gold-tungsten wire having a conical tip (wire diameter: 50 μm, tip diameter: 10 μm or less), and were opposed in the reaction cell at a gap between the tip of 100 μm. After introduction of the above mixture from the liquid introduction opening into the reaction cell, the CRP concentration was measured by detecting the agglutination state by means of a measurement apparatus shown in FIG. 26.

Figure 26:
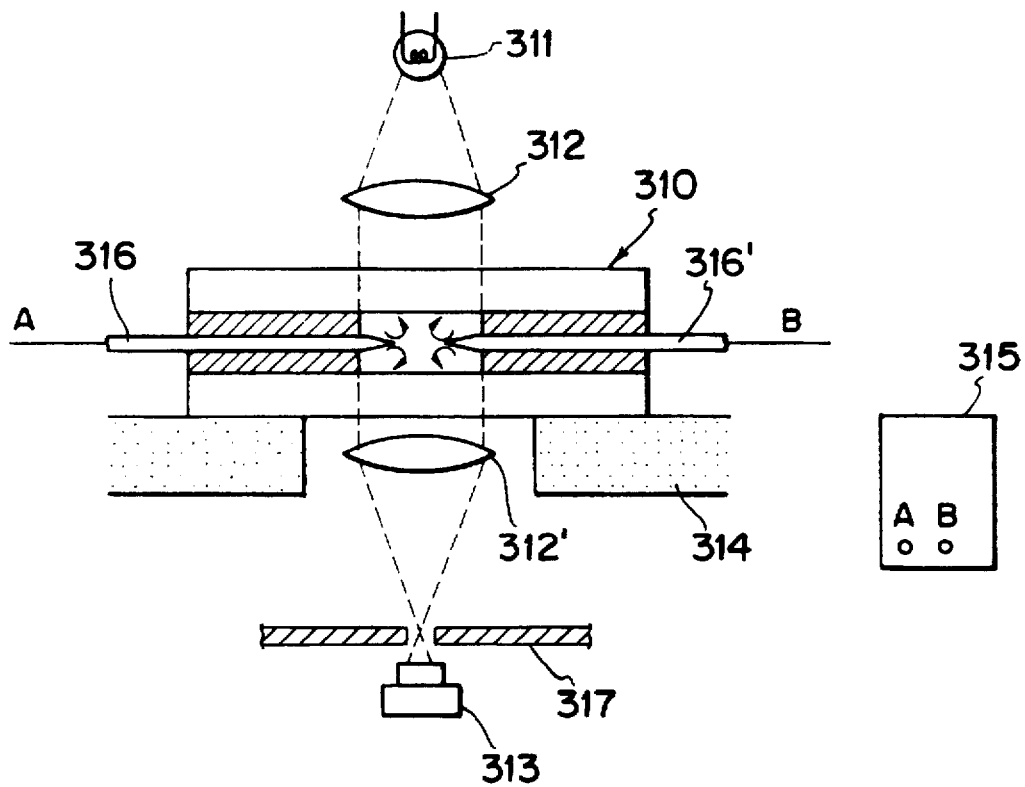
FIG. 26 illustrates roughly the constitution of the concentration-measuring apparatus of Example 5.

The apparatus in FIG. 26 comprises a reaction cell 310, a halogen lamp 311, lenses 312, 312', a photodiode 13, a stage 14 equipped with a heater, a high frequency power source 315, electrodes 316, 316', and a pinhole plate 317.

The liquid mixture in the reaction cell was kept at 37° C. with a heater in stage 314, and in this state, a rectangular wave voltage of 1 MHz and ±10 V was applied between the electrodes by the high frequency power source 15 for 100 seconds to agitate the liquid mixture between the electrodes. Thereby the liquid mixture between the electrodes was driven to flow in the direction shown by the arrow marks in FIG. 26, and was agitated. After the agitation, the agglutination state was measured by measuring the transmitted light intensity. The CRP concentration in the sample liquid was measured by comparing the obtained data with the preliminarily prepared calibration curve.

Comparative Example 1

The measurement was practiced in the same manner as in Example 5 except that the voltage was not applied between the electrodes. After 100 seconds, the agglutination state of the liquid mixture was detected. As the results, the degree of agglutination was low, and the CRP concentration was underestimated according to the preliminarily prepared calibration curve, and the precise measurement value could not obtained.

EXAMPLE 6

Figure 27:
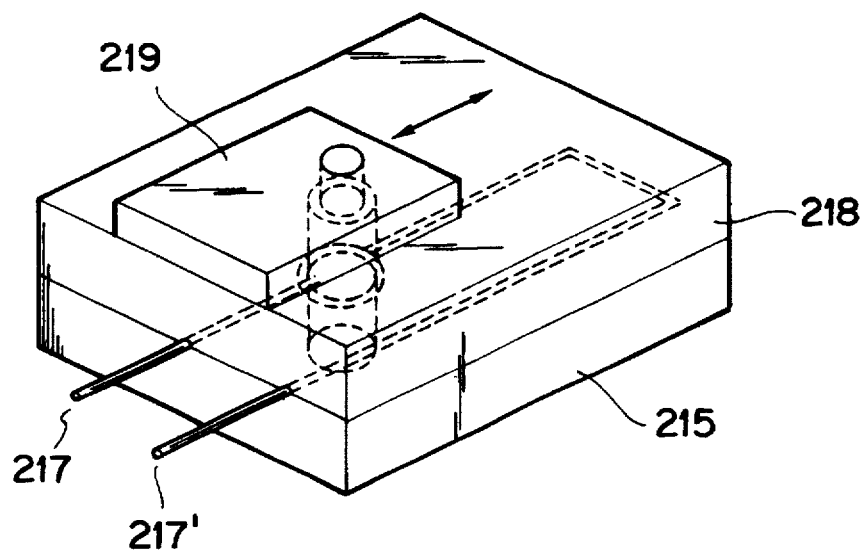
FIG. 27 is a perspective view of the reaction cell used in Example 6 and Comparative Example 2.
Figure 28:
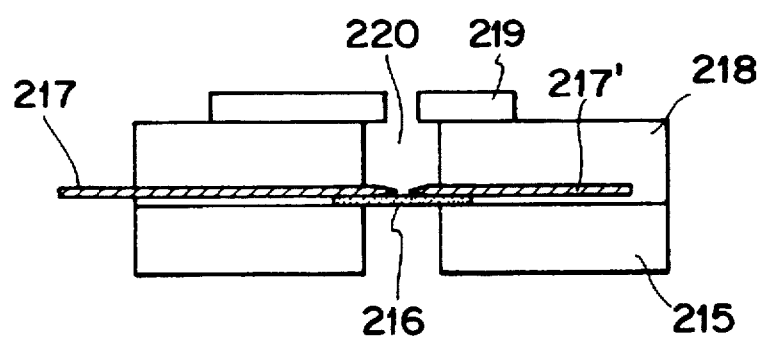
FIG. 28 is a cross-sectional view of the reaction cell of FIG. 27.

A detection apparatus of the present invention was constructed with the reaction cell 220 as shown in FIG. 27 (perspective view) and FIG. 28 (sectional view).

Firstly, the preparation method of the reaction cell is described below.

An acrylic resin plate 15 of 20 mm×30 mm, and 3 mm thick was bored to make a hole of 8 mm in diameter. Thereon, a filter 16 made of cellulose (thickness: 500 μm, diameter: 10 mm, pore diameter: 0.2 μm) was bonded with an adhesive. The cellulose filter 16 was preliminarily sensitized to a human CRP antibody (TgG fraction) to form thereby a reagent region comprising a solidified reagent.

Then electrodes 217, 217' formed from a tungsten wire having a conical tip (wire diameter: 50 μm, tip diameter: 10 μm or less) was placed in opposition with a gap of the tips of 200 μm at the center of the hole of 8 mm diameter and on the filter 16. Further thereon, an acrylic resin plate 218 of 3 mm thick having a hole of 8 mm diameter was bonded with interposition of the electrodes 217, 217'.

Further, thereon an acrylic resin plate 19 of 0.5 mm thick having a hole of 4 mm diameter was placed as a cover.

Figure 29:
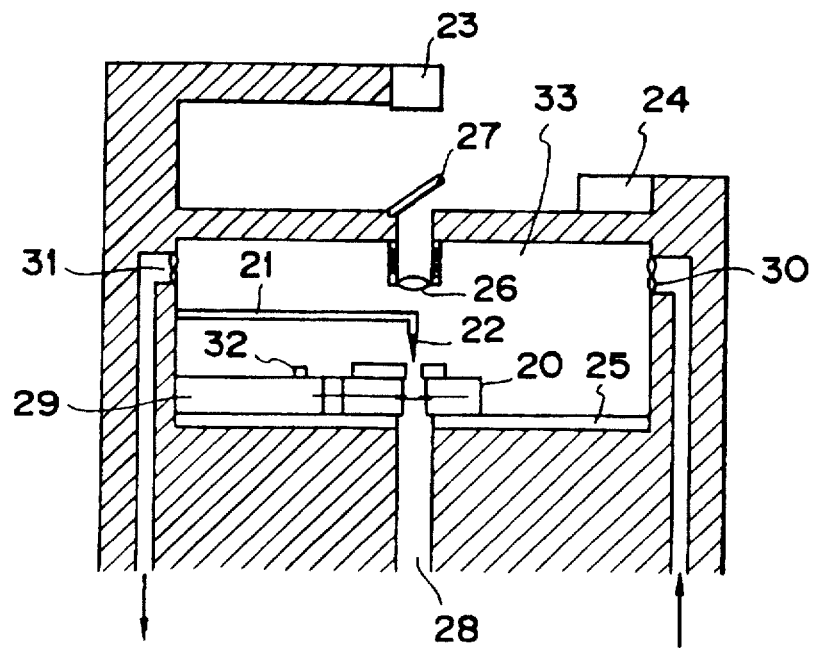
FIG. 29 illustrates the arrangement of the detection apparatus of the present invention during liquid feeding in Example 6 and Comparative Example 2.
Figure 30:
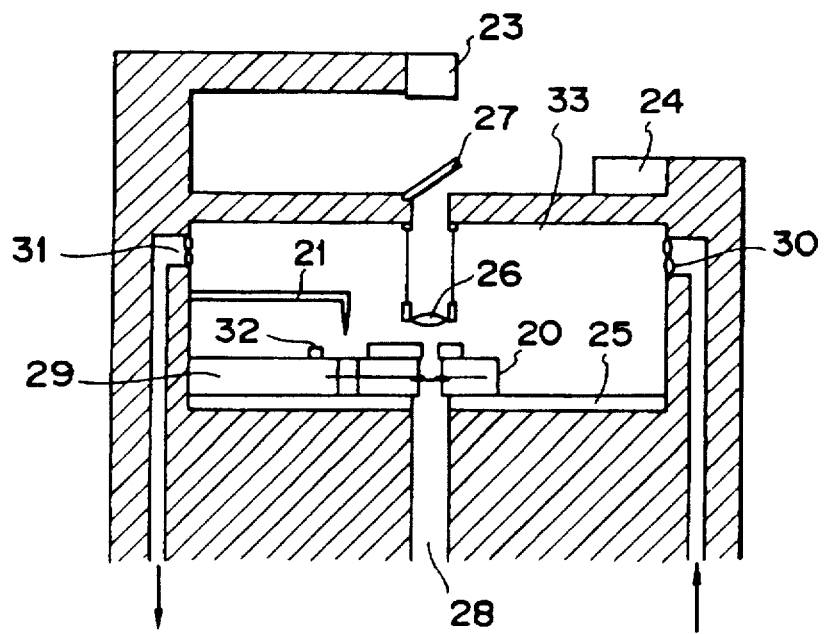
FIG. 30 illustrates the arrangement of the detection apparatus of the present invention during detection of the fluorescent light in Example 6 and Comparative Example 2.

With the reaction cell prepared as above, a detection apparatus was prepared which has construction as shown in FIG. 29 and FIG. 30.

The detection apparatus in FIG. 29 and FIG. 30 comprises a reaction cell 20, an arm 21, a dispenser tip, an Ar ion laser 23, a photomultiplier 24, a rubber sheet 25, a condensing lens 26, a dichroic mirror 27, a liquid suction opening 28, a receptacle for electrode 29, fans 30, 31, and a temperature sensor 32.

The measurement apparatus has a working space 33 for placement of the reaction cell or other operations, and therein air is circulated from an air conditioner by fans 30, 31, and the temperature is kept at a desired level by control of the temperature and amount of the circulating air in response to the signal from the temperature sensor 32.

FIG. 29 is a drawing for explaining the case where a sample liquid containing a minute substance, a labelled reagent liquid, or a cleaning liquid is dropped to the reaction cell 20. The tip of the dispenser is constructed of a detachable dispenser tip 22 formed from a synthetic resin, and sucks and discharge the liquid. By changing the dispenser tip 22 in correspondence with the kind of the liquid, contamination between different liquid is avoided. The dispenser is movable by the arm 21 between the upper portion of the reaction cell and the container (not shown in the drawing) holding the liquid to be dropped.

FIG. 30 is a drawing for explaining the case where the intensity of fluorescence from the reagent region on the filter in the reaction cell. The laser berm from the Ar ion laser 23 is illuminated onto the reagent region by the condenser lens 26. Fluorescent light and scattered laser light from the reagent region are again condensed by the condenser lens 26, and only the fluorescent light is reflected by the dichroic mirror 27 to be separated from the laser light. The separated fluorescent light is introduced to the photomultiplier 24 and detected thereby.

In this Example, a reaction cell having a filter sensitized to a human CRP antibody (IgG fraction) was set on a rubber sheet 25 in a detection apparatus. The electrodes in the cell was connected to the connector 29 for voltage application. Then the cover of the reaction cell was slid to open the liquid-retaining portion, and 200 μl of a sample solution containing a minute substance was dropped from the dispenser to the liquid-retaining portion. And the cover was slid to close the reaction cell. The sample liquid on the filter was agitated by application of rectangular wave voltage of 1 MHz and ±12 V at a temperature of the working space 33 of the measurement apparatus maintained at 37° C.

The voltage application was stopped and the remaining sample liquid was removed by sucking from the back side of the filter.

Separately a florescence-labelled reagent liquid was prepared by dissolving an FITC-labelled human CRP antibody (IgG fraction) by diluting to a concentration of 0.2 mg/ml with a phosphate buffer-physiological saline of pH 7.2 (hereinafter referred to as PBS). 200 µl of this labelled reagent liquid was dropped from the dispenser, and the steps to the removal was repeated in the same manner as the sample liquid. Then 150 µl of a cleaning solution (PBS) was dropped and the cleaning liquid was removed similarly. This cleaning step was repeated three times. Finally, the cover was slid to open the apparatus, and Ar ion laser beam was illuminated through the condenser lens having been moved to the position above the reagent region on the filter. Thereby fluorescent light was received and the object of measurement in the sample liquid was detected.

Comparative Example 2

The same process was conducted as in Example 6 except that a voltage was not applied between the electrodes in the reaction cell when the sample liquid is allowed to act on the reagent region. The intensity of the fluorescent light coming from the reagent region on the filter was measured in the same manner, and found to be ½ of the intensity in Example 6. To obtain the same intensity of the fluorescent light as in Example 6, the required retention time for the reaction was twice that of Example 6.

EXAMPLE 7

Figure 31:
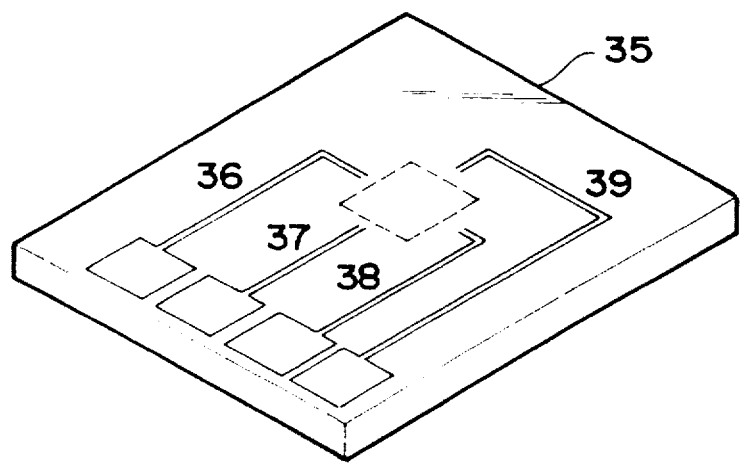
FIG. 31 illustrates the pattern of the electrodes of the reaction cell used in Example 7 and Comparative Example 3.

Electrode patterns 36, 37, 38, 39 were prepared by a printing method on a polystyrene sheet 35 of 500 µm thick, 40 mm long, and 30 mm wide as shown in FIG. 31.

In the region surrounded by a dotted line in FIG. 31, a human β2-microglobulin antibody was fixed to form a reagent region comprising the solidified reagent.

Figure 32:
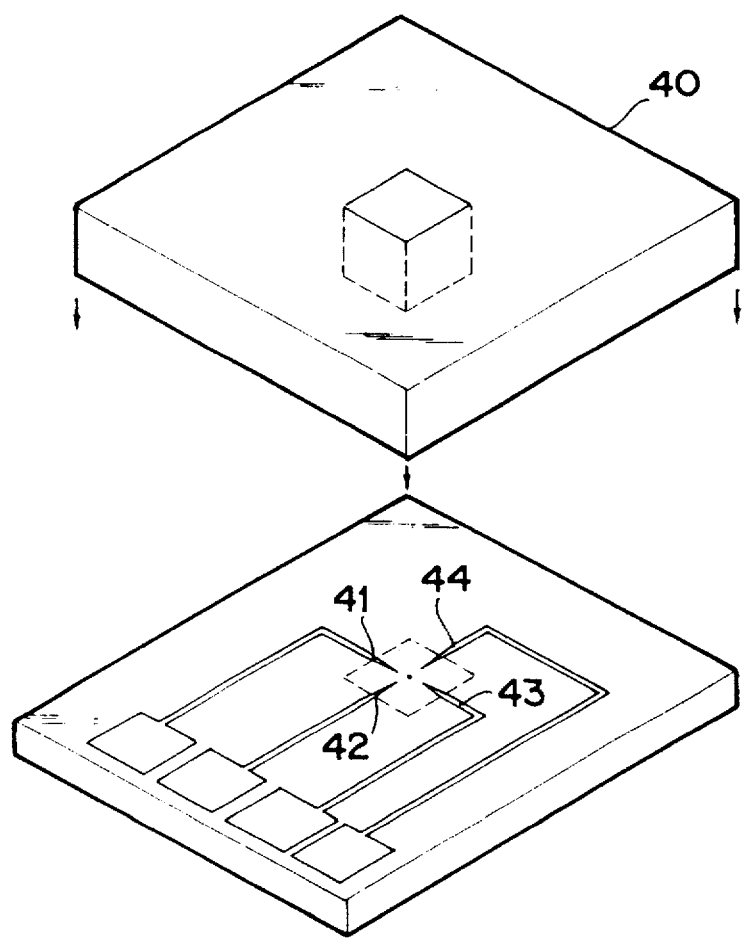
FIG. 32 illustrate the reaction cell used in Example 7 and Comparative Example 3.
Figure 33:
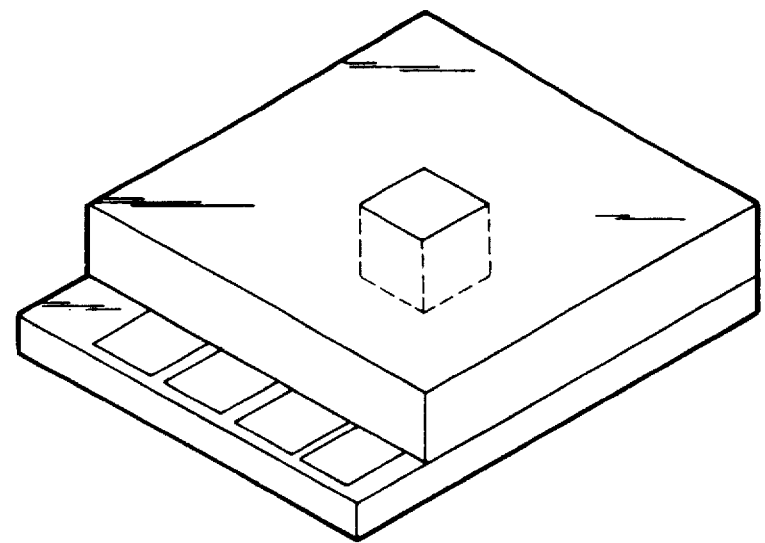
FIG. 33 is a perspective view of the entire reaction cell used in Example 7 and Comparative Example 3.

To the end of the respective electrode patterns 36, 37, 38, 39, a gold-tungsten wire electrode (wire;diameter: 50 µm, tip diameter: 10 µm or less) was connected (opposing electrode distance: 150 µm). FIG. 32 shows the gold tungsten wires 41, 42, 43 and 44 connected to electrode patterns 36, 37, 38 and 39 shown in FIG. 31. Thereon an acrylic resin plate 40 of 30 mm square and 3 mm thick having a 6 mm-square aperture at the center was placed and bonded to prepare a reaction cell shown in FIG. 33.

Figure 34:
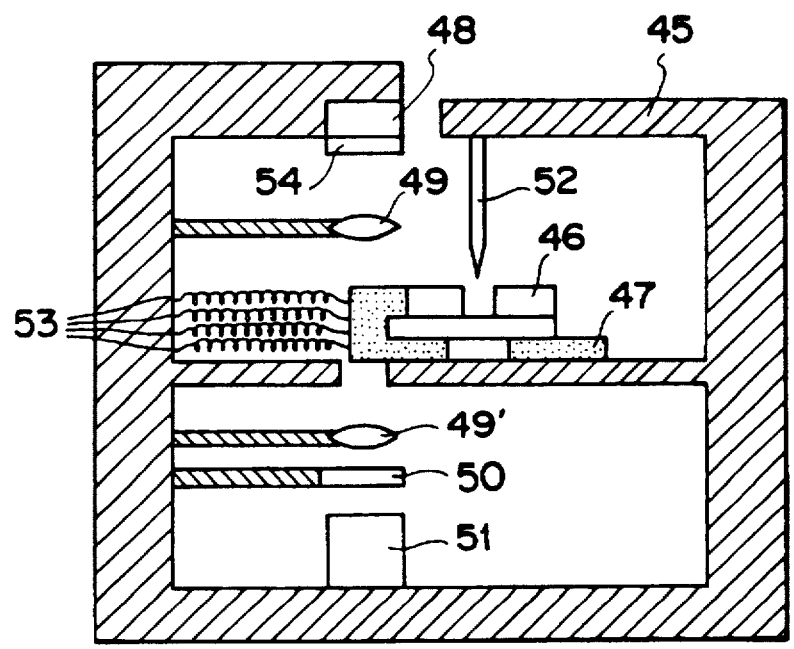
FIG. 34 illustrates the arrangement of the detection apparatus of the present invention during liquid feeding in Example 7 and Comparative Example 3.
Figure 35:
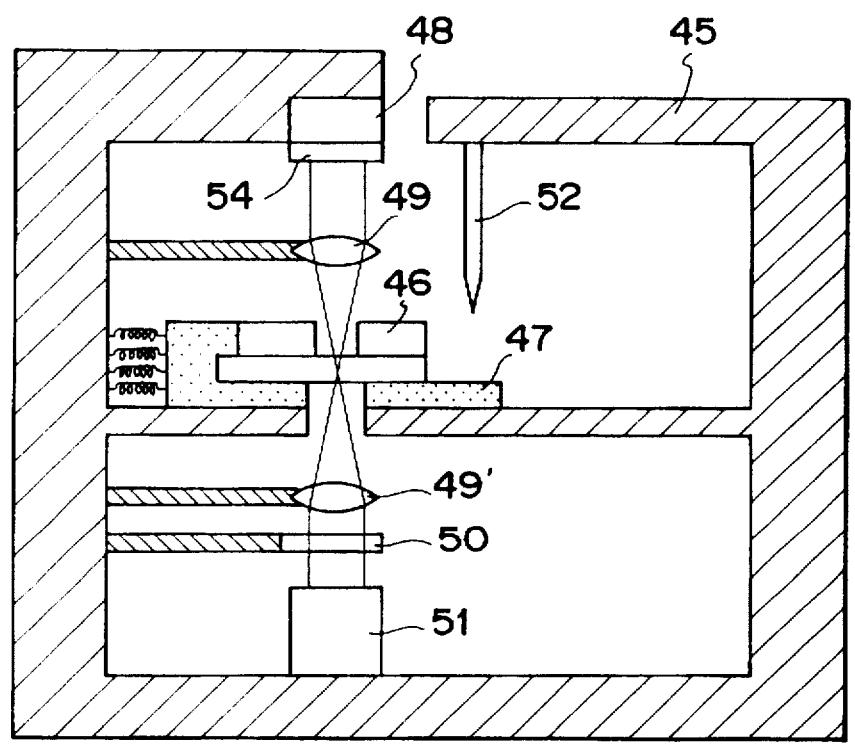
FIG. 35 illustrates the arrangement of the detection apparatus of the present invention during detection of the fluorescent light in Example 7 and Comparative Example 3.

FIG. 34 and FIG. 35 show constitution of the detection apparatus 45 employed in this Example.

The reaction cell 46 is set on a movable stage 47. A connector for the four electrode terminals is provided on the movable stage 47, and the movable stage 47 is connected to an external power source (not shown in the drawing) by a cable 53. The movable stage 47 has a heater therein to keep a constant temperature.

FIG. 34 illustrates an arrangement for the case where a required amount of a liquid (e.g., a sample liquid, a reagent liquid, etc.) is introduced from a dispenser into the reaction cell 46.

FIG. 35 illustrates an arrangement for the case where the intensity of fluorescent light coming from the reagent region in the reaction cell. The light emitted by an xenon lamp 48 is filtered by a band-pass filter 54 to select the required wavelength of light only. The selected light is illuminated through a condenser lamp 49 to the reagent region. The transmitted light and the fluorescent light from the reagent region are collected by a condenser lens 49', and are filtered by a band-pass filter 50 to pass only the fluorescent light. This fluorescent light is detected by a photomultiplier 51.

With this detection apparatus, an experiment was conducted as below.

The arrangement shown in FIG. 34 was employed. 100 µl of a sample liquid containing an object of measurement was introduced into the reaction cell, and the reaction cell was set on a movable stage 47 of the detection apparatus. A rectangular wave voltage of 1 MHz and ±10 V was applied to the two pairs of opposing electrodes for 8 minutes to agitate the liquid. The temperature of the movable stage was kept at 37° C.

After the voltage application was stopped, the excess sample liquid was removed by the dispenser 52, and then 100 µl (concentration: 0.2 mg/ml) of human β2-microglobulin antibody (polyclonal antibody, IgG fraction) labelled with alkaline phosphatase was dropped thereto. Then the voltage was again applied for 15 minutes. Thereafter, the excess labelled reagent liquid was removed by the dispenser 52 similarly as above, and washed with PBS.

After the washing, 1 ml of a substrate liquid containing 4-methylumbelliferylphosphoric acid (4-MUP) was dropped thereto, and the voltage was applied for 3 minutes. Then the movable stage was moved to the position shown in FIG. 35, and 4-methylumbelliferon (4-MU) having formed in the reagent region between the pairs of electrodes was detected by utilizing the fluorescent light coming from the reagent region by the above-mentioned optical detection means, thereby detecting the object in the sample liquid.

Comparative Example 3

The same experiment was conducted as in Example 7 except that the sample liquid was brought into contact with the reagent region and reacted with it without application of voltage. Consequently, the intensity of the detected fluorescent light was ¾ of the intensity in Example 7. To obtain the same fluorescent light intensity, a 1.5-fold length of the retention time was required for the reaction.

EXAMPLE 8

Figure 36:
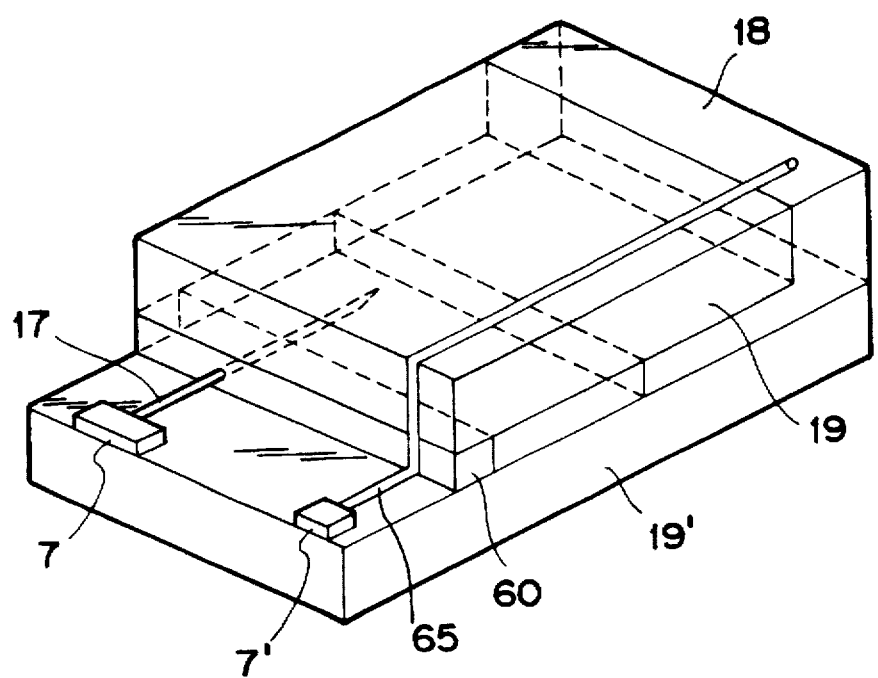
FIG. 36 is a perspective view of a measurement cell used in Example 8.

A measurement cell illustrated in FIG. 36 was prepared. A gold-tungsten alloy wire 17 having a conical tip (wire diameter: 50 µm, tip diameter; 10 µm or less) was employed as the working electrode. An L-shaped stainless steel block 18 (electrode portion: 150 µm thick, block portion: 1.15 mm thick) was employed as the counter electrode. The opposing electrodes were held between two sheets of slide glass of 1 mm thick 19, 19', and were bonded with an adhesive 60 to fix the counter electrode and the working electrode at a distance of 100 µm. Two terminals for the electrodes 7 and 7' were provided at one side of the cell, and were respectively connected to the working electrode 17 and the counter electrode 18, with a connection wire 65 between the electrode terminal 7' and the counter electrode 18.

Between the glass substrates of the measurement cell prepared above, a liquid medium was introduced which had been prepared by dispersing polystyrene latex particles of 5 µm diameter (made by JSR) in an aqueous potassium chloride solution having electric conductivity of 1 mS/cm (particle concentration of $10^6$ particles/ml).

Figure 37:
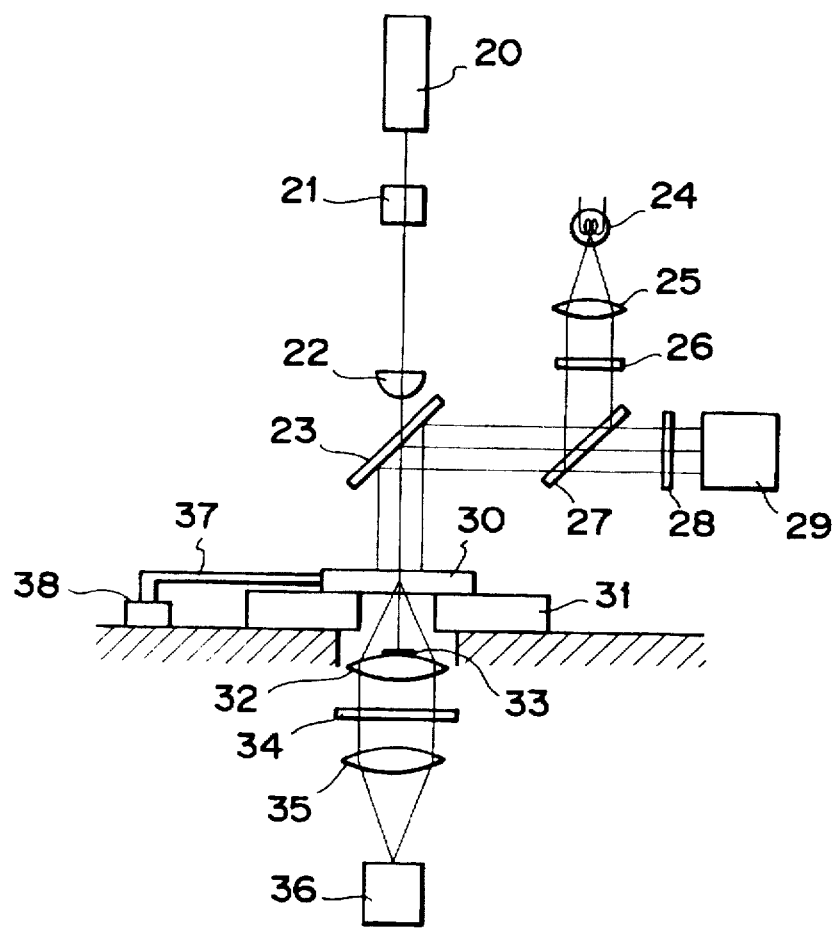
FIG. 37 illustrates the constitution of the fine particle detection apparatus of the present invention used in Example 8.

FIG. 37 illustrates constitution of the detection apparatus employed in this Example. The apparatus comprises an He—Ne laser (wavelength: 633 nm, output: 10 mW), cylindrical lenses 21, 22, a dichroic mirror transmitting He—Ne laser while reflecting light of 400 to 600 nm, 23 a halogen lamp 24, a condenser lens 25, a band-pass filter 26 (transmission wavelength: 400 to 600 nm), a half mirror 27, a band-pass filter 28 (90% interception of He—Ne laser), a CCD camera 29, a measurement cell 30, a movable stage 31, a condenser lens 32, a beam stopper 33, a band-pass filter 34 (transmitting He—Ne laser only, intercepting light of 400 to 600 nm), a lens 35, a photodiode 36, lead wires 37, and a connector 38.

Figure 38:
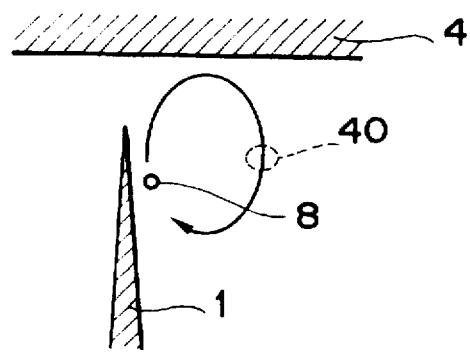
FIG. 38 illustrates the position of light projection in detection of the fine particles in Example 8.

A measurement cell 30 was fixed on a movable stage 31. Electrode terminals on the measurement cell were connected by lead wires 37 to a connector 38 to connect it to a voltage application power source (not shown in the drawing). A circular light beam emitted from an He—Ne laser 20 (wavelength: 633 nm, output: 10 mW) was reformed into an ellipsoidal light beam by two cylindrical lenses 21, 22, and was illuminated to the vicinity of a working electrode in the measurement cell 30. The ellipsoidal light beam was directed such that the major axis of the ellipsoidal spot 40 was perpendicular to the flowing direction of the particles circulating in the vicinity of the working electrode as shown in FIG. 38. The projection spot is controlled by a CCD camera and the movable stage 31.

The ellipsoidal light beam which has not been scattered by the fine particles and transmitted is intercepted by a beam stopper 33 and is not detected by a photodiode 36. On the contrary, the light beam which has been scattered by particles circulating in the measurement cell is condensed by a condenser lens 32, and is detected by the photodiode 36.

Figure 39:
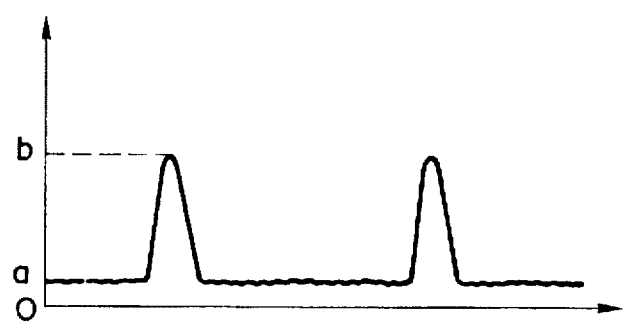
FIG. 39 illustrates the wave-form of the signal of the scattered light from the detected fine particles in Example 8.

On application of rectangular wave voltage of ±10 V and frequency of 1 MHz, the fine particles in the cell was driven to circulate in the vicinity of the working electrode (cycle of about 0.5 second). The position of the spot of the He—Ne laser light projection was adjusted by observation with a CCD camera. The presence of fine particles was observed at a signal intensity ratio of about 20. The signal intensity ratio herein was derived from an oscillograph wave-form obtained by measuring the photodiode output signal by an oscilloscope. The obtained oscillograph signal wave-form is shown in FIG. 39.

EXAMPLE 9

Figure 40:
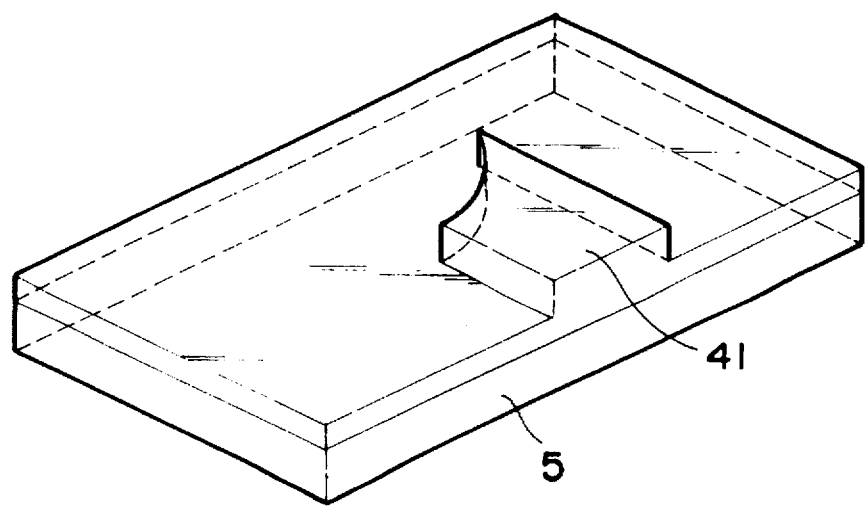
FIG. 40 is a perspective view showing roughly the constitution of the substrate of the one side of the measurement cell used in Example 9.

As shown in FIG. 40, a molded article 41 was prepared by applying an epoxy type photosetting resin, Adeka KS820 (made by Asahi Denka Kogyo K. K.), on a glass substrate 5 of 0.9 mm thick and curing the resin under ultraviolet light irradiation by stamper molding.

Figure 41:
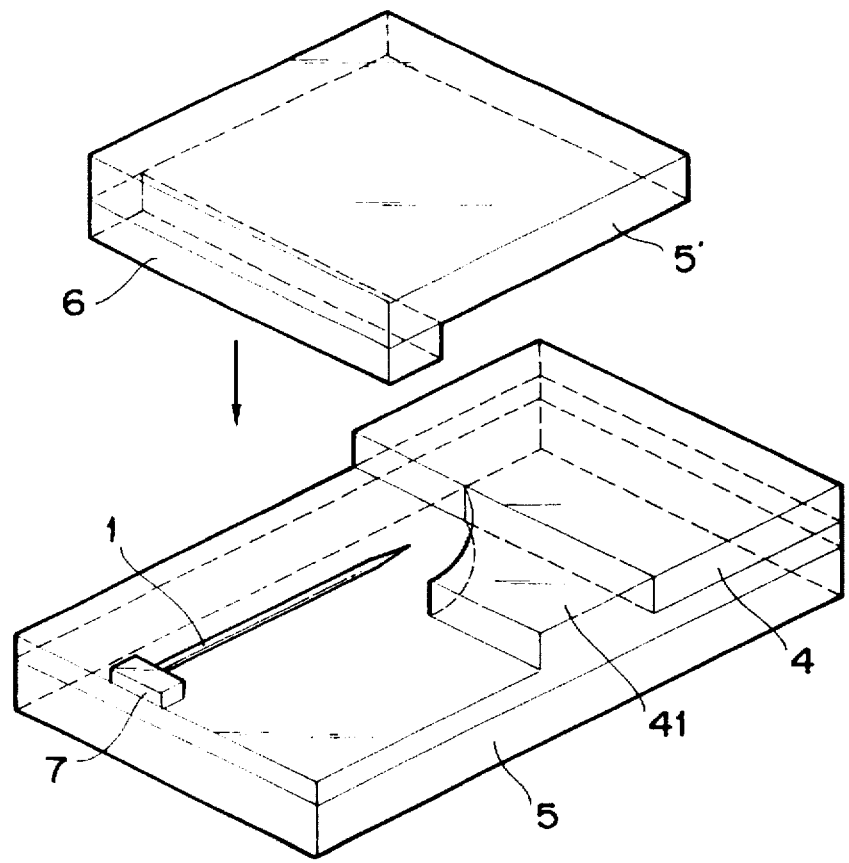
FIG. 41 is a perspective view showing roughly the constitution of the measurement cell used in Example 9.
Figure 42:
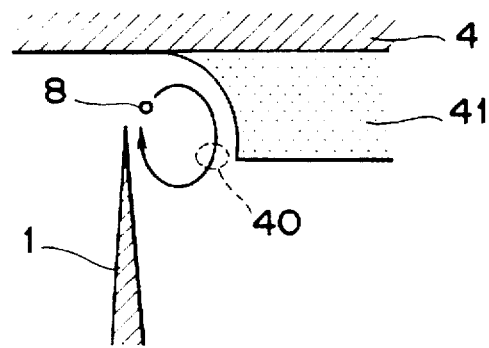
FIG. 42 illustrates the position of light projection in detection of the fine particles in Example 9.

A measurement cell was prepared as shown in FIG. 41 by use of this substrate 5 as one of the substrates in the same manner as in Example 8.

On application of a rectangular wave voltage of ±9 V and 1 MHz between the electrodes 1, 4, the fine particles circulate along the side face of the molded article 41. The fine particles were detected with the same apparatus as the one shown in FIG. 37 at a signal intensity ratio of 25.

As described above, the liquid-driving method or the liquid delivering apparatus of the present invention does not require separately a magnetic field-applying means and an electric field-applying means in contrast to conventional methods or apparatuses, and is capable of driving stably an ionic conductive liquid in a relatively broad range of ionic conductivity in a restricted minute region without causing electrolysis and capable of controlling the flow rate thereof.

Accordingly, a sample liquid containing a object of measurement and a biological substance capable of linking to the object of measurement are allowed to cause agglutination reaction by dispersing the sample liquid and the biological substance in a ionic conductive liquid medium, introducing the resulting dispersion between a pair of electrodes, and applying a periodically changing voltage to the electrodes to apply electromagnetic force to ions in the liquid medium in a minute region in the vicinity of the electrodes. Thereby the agglutination reaction can be conducted simply in a minute amount of liquid (dispersion medium, sample liquid, etc.) in a short time with smaller apparatus.

Further, a reaction process of a solidified reagent, a minute substance in a sample liquid, and a detection reagent, or cleaning process with a cleaning liquid can be conducted efficiently by agitating a liquid (sample liquid, reagent liquid, cleaning liquid, etc.) by exerting electromagnetic force to ions in the liquid, whereby the time for the reaction or cleaning can be shortened, and enables detection of a minute amount of a substance in a shorter time, and enables detection of a minute amount of substance in a minute amount of sample liquid.

Furthermore, a fine particles in a minute amount of liquid can be readily detected by introducing a fine particle-containing ionic conductive liquid medium between a pair of electrodes, applying a periodically changing voltage between the electrodes to drive the liquid medium in a fine region around the electrode to cause circulating motion of the fine particles, and detecting the circulating fine particles. The detection apparatus can be made simple thereby.

What is claimed is:

1. A method for driving an ionic conductive liquid, comprising placing a pair of electrodes in the ionic conductive liquid, and applying a low voltage insufficient to cause electrolysis of the liquid or anodic oxidation of the electrodes between the pair of electrodes, said voltage generating both an electric field and a magnetic field around at least one of the pair of electrodes so that a strong electromagnetic force from the magnetic field sufficient to drive the ionic conductive liquid is exerted on the liquid, wherein at least one of the pair of electrodes is a needle-shaped electrode, thereby driving the ionic conductive liquid substantially parallel to a surface of said needle-shaped electrode.

2. A method for driving an ionic conductive liquid, comprising feeding the ionic conductive liquid to a gap between a pair of electrodes, and applying a low voltage insufficient to cause electrolysis of the liquid or anodic oxidation of the electrodes between the pair of electrodes, said voltage generating both an electric field and a magnetic field around at least one of the pair of electrodes so that a strong electromagnetic force from the magnetic field sufficient to drive the ionic conductive liquid is exerted on the liquid, wherein at least one of the pair of electrodes is a needle-shaped electrode, thereby driving the ionic conductive liquid substantially parallel to a surface of said needle-shaped electrode.

3. A method according to claim 1 or 2, wherein, the voltage is a periodically changing voltage.

4. A method according to claim 1 or 2, wherein, the voltage is an AC voltage.

5. A method according to claim 1 or 2, wherein the liquid has an electric conductivity of not less than $10^{-5}$ S/cm.

6. A method according to claim 1 or 2, wherein the liquid has an electric conductivity of not less than $10^{-4}$ S/cm.

7. A method according to claim 1 or 2, wherein a plurality of pairs of electrodes are employed.

8. A method for mixing and agitating a medium, comprising feeding the medium to an ionic conductive liquid, placing a pair of electrodes in the ionic conductive liquid, and applying a low voltage insufficient to cause electrolysis of the liquid or anodic oxidation of the electrodes between the pair of electrodes, said voltage generating both an electric field and a magnetic field around at least one of the pair of electrodes so that a strong electromagnetic force from the magnetic field sufficient to drive the ionic conductive liquid is exerted on the liquid to drive the liquid and to mix and agitate the medium, wherein at least one of the pair of electrodes is a needle-shaped electrode, thereby driving the ionic conductive liquid substantially parallel to a surface of said needle-shaped electrode.

9. A method for mixing and agitating a medium, comprising feeding an ionic conductive liquid and a medium to a gap between a pair of electrodes, and applying a low voltage insufficient to cause electrolysis of the liquid or anodic oxidation of the electrodes between the pair of electrodes, said voltage generating both an electric field and a magnetic field around at least one pair of electrodes so that a strong electromagnetic force from the magnetic field sufficient to drive the ionic conductive liquid is exerted on the liquid to drive the liquid and to mix and agitate the medium, wherein at least one of the pair of electrodes is a needle-shaped electrode, thereby driving the ionic conductive liquid substantially parallel to a surface of said needle-shaped electrode.

10. A method according to claim 8 or 9, wherein the medium contains fine particles.

11. A method according to claim 8 or 9, wherein the medium is a dispersion of fine particles.

12. A method according to claim 8 or 9, wherein the medium contains agglutinative fine particles.

13. A method according to claim 8 or 9, wherein, the voltage is a periodically changing voltage.

14. A method according to claim 8 or 9, wherein, the voltage is an AC voltage.

15. A method according to claim 8 or 9, wherein the liquid has an electric conductivity of not less than $10^{31\ 5}$ S/cm.

16. A method according to claim 8 or 9, wherein the liquid has an electric conductivity of not less than $10^{-4}$ S/cm.

17. A method according to claim 8 or 9, wherein a plurality of pairs of electrodes are employed.

18. A method for driving an ionic conductive liquid, comprising placing a pair of electrodes in the ionic conductive liquid, and applying a voltage at a gap between the pair of electrodes, said voltage generating both an electric field and a magnetic field around at least one of the pair of electrodes so that a strong electromagnetic force from the magnetic field sufficient to drive the ionic conductive liquid is exerted on the liquid, wherein (i) at least one of the pair of electrodes is a needle-shaped electrode, thereby driving the ionic conductive liquid substantially parallel to a surface of said needle-shaped electrode, (ii) the voltage is an AC voltage selected such that an electric field strength of $10^4$ to $10^6$ V/m is obtained at the gap, and (iii) a liquid is used having an electric conductivity of not less than $10^{-5}$ S/cm.

* * * * *

UNITED STATES PATENT AND TRADEMARK OFFICE
CERTIFICATE OF CORRECTION

PATENT NO. : 5,788,819
DATED : August 4, 1998
INVENTOR(S) : TOSHIKAZU ONISHI, ET AL.

It is certified that error appears in the above-identified patent and that said Letters Patent is hereby corrected as shown below:

On the title page,

AT [56] REFERENCES CITED

OTHER PUBLICATIONS

"A Faure et al." should read --A. Faure et al.--; and
"Peptites," Protites" should read
--Peptides," Protides--.

AT [57] ABSTRACT

Line 13, "an" should read --a--.

IN THE DRAWINGS

Sheet 1, FIGS. 1A-1C, replace Figures 1A to 1B
with attached amended Figures 1A to 1C.

COLUMN 2

Line 17, "difficult, disadvantageously." should read --difficult.--;
Line 41, "possible." should read --impossible.--;
Line 43, "A. Fature" should read --A. Faure--; and
Line 47, "Fature" should read --Faure--.

UNITED STATES PATENT AND TRADEMARK OFFICE
CERTIFICATE OF CORRECTION

PATENT NO. : 5,788,819
DATED : August 4, 1998
INVENTOR(S) : TOSHIKAZU ONISHI, ET AL.

It is certified that error appears in the above-identified patent and that said Letters Patent is hereby corrected as shown below:

COLUMN 3

Line 16, "method" should read --methods--;
Line 17, "material a" should read --material of a--;
Line 31, "particle" (first occurrence) should read --particles--;
Line 51, "exhibits" should read --which exhibits--; and
Line 52, "above mentioned" should read --above-mentioned--.

COLUMN 4

Line 14, "enable" should read --enables--.

COLUMN 5

Line 29, "illustrates" should read --illustrate--.

COLUMN 7

Line 52, "weaken" should read --weakens--; and
Line 57, "exert" should read --exerts--.

COLUMN 8

Line 1, "Simultaneously" should read --Simultaneously,--.

UNITED STATES PATENT AND TRADEMARK OFFICE
CERTIFICATE OF CORRECTION

PATENT NO. : 5,788,819           Page 3 of 8
DATED : August 4, 1998
INVENTOR(S) : TOSHIKAZU ONISHI, ET AL.

It is certified that error appears in the above-identified patent and that said Letters Patent is hereby corrected as shown below:

COLUMN 10

Line 6, "the both substance" should read
        --both substances--;
    Line 18, "viruses" should read --viruses,--;
    Line 33, "diphtheria," should read --diphtherine,--; and
    Line 43, "causes" should read --cause--.

COLUMN 11

Line 5, "diameter" should read --diameters--;
    Line 16, "method" should read --methods--;
    Line 28, "To" should read --On--;
    Line 32, "group" should read --groups--; and
    Line 52, "On" should read --One--.

COLUMN 12

Line 14, "reaction:" should read --reactions:--;
    Line 38, "to" should read --on--;
    Line 41, "simple" should read --simply--;
    Line 53, "electrode" should read --electrodes--;
    Line 54, "8, 8'" should read --308, 308'--; and
    Line 55, "electrodes 8, 8'" should read
        --electrodes 308, 308'--.

COLUMN 13

Line 30, "solution." should read --solutions.--; and
    Line 38, "electrode," should read --electrodes,--.

UNITED STATES PATENT AND TRADEMARK OFFICE
CERTIFICATE OF CORRECTION

PATENT NO. : 5,788,819
DATED : August 4, 1998
INVENTOR(S) : TOSHIKAZU ONISHI, ET AL.

It is certified that error appears in the above-identified patent and that said Letters Patent is hereby corrected as shown below:

COLUMN 20

```
Line 1,  "filter 16" should read --filter 216--;
Line 8,  "filter 16." should read --filter 216.--;
Line 11, "plate 19" should read --plate 219--;
Line 17, "tip," should read --tip 22,--;
Line 34, "discharge" should read --discharges--;
Line 36, "liquid" should read --liquids--;
Line 41, "from" should read --is from--;
Line 42, "berm" should read --beam--; and
Line 66, "florescence-labelled" should read
         --fluorescence-labelled--.
```

UNITED STATES PATENT AND TRADEMARK OFFICE
CERTIFICATE OF CORRECTION

PATENT NO. : 5,788,819
DATED : August 4, 1998
INVENTOR(S) : TOSHIKAZU ONISHI, ET AL.

It is certified that error appears in the above-identified patent and that said Letters Patent is hereby corrected as shown below:

COLUMN 21

Line 35, "(wire;diameter:" should read --(wire diameter:--;
    Line 37, "gold tungsten" should read --gold-tungsten--;
    Line 56, "coming" should read --comes--; and
    Line 57, "an" should read --a--.

COLUMN 22

Line 40, "diameter;" should read --diameter:--; and
    Line 63, "nm, 23" should read --nm 23,--.

COLUMN 23

Line 44, "substrate 5" should read --substrate 5'--;
    Line 60, "a" (second occurrence) should read --an--; and
    Line 64, "a" should read --an--.

COLUMN 24

Line 15, "a" (first occurrence) should be deleted;
    Line 49, "wherein," should read --wherein--; and
    Line 51, "wherein," should read --wherein--.

UNITED STATES PATENT AND TRADEMARK OFFICE
CERTIFICATE OF CORRECTION

PATENT NO. : 5,788,819
DATED : August 4, 1998
INVENTOR(S) : TOSHIKAZU ONISHI, ET AL.

It is certified that error appears in the above-identified patent and that said Letters Patent is hereby corrected as shown below:

COLUMN 14

Line 17, "complementarily." should read --competitively.--; and
    Line 23, "method" should read --method,--.

COLUMN 15

Line 51, "source 10" should read --source 210--; and
    Line 67, "tungsten," should read --tungsten--.

COLUMN 16

Line 5, "a" should read --an--;
    Line 17, "Further" should read --Further,--;
    Line 22, "is" should read --are--;
    Line 31, "electrode)4" should read --electrode)1--;
    Line 40, "tip" should read --the tip--; and
    Line 47, "etc." should read --etc.).--.

COLUMN 17

Line 18, "tungsten," should read --tungsten--.

COLUMN 19

Line 31, "photodiode 13," should read --photodiode 313,--;
    Line 32, "14" should read --314--;
    Line 37, "source 15" should read --source 315--;
    Line 51, "results," should read --result,--;
    Line 55, "obtained." should read --be obtained.--;
    Line 64, "plate 15" should read --plate 215--; and
    Line 66, "filter 16" should read --filter 216--.

UNITED STATES PATENT AND TRADEMARK OFFICE
CERTIFICATE OF CORRECTION

PATENT NO. : 5,788,819
DATED : August 4, 1998
INVENTOR(S) : Toshikazu Onishi, et al.

It is certified that error appears in the above-identified patent and that said Letters Patent is hereby corrected as shown below:

<u>COLUMN 26</u>

Line 1, "wherein," should read --wherein--;
    Line 3, "wherein," should read --wherein--; and
    Line 5, "$10^{31\ 5}$ S/cm." should read --$10^{-5}$ S/cm.--.

Signed and Sealed this

Fourth Day of May, 1999

Attest:

Q. TODD DICKINSON

*Attesting Officer*     *Acting Commissioner of Patents and Trademarks*